March 2, 1943.  T. R. HARRISON  2,312,711
CONTROL APPARATUS
Filed March 24, 1939  5 Sheets-Sheet 1
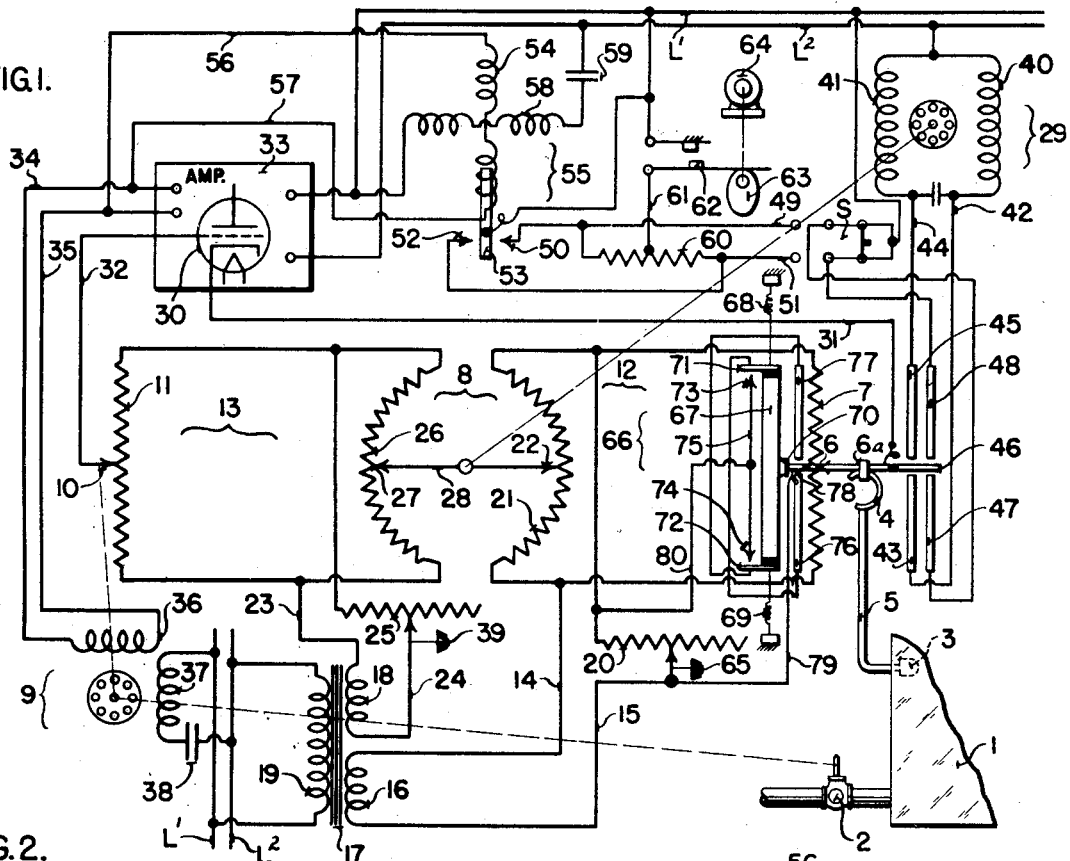
FIG. 1.
FIG. 1A.
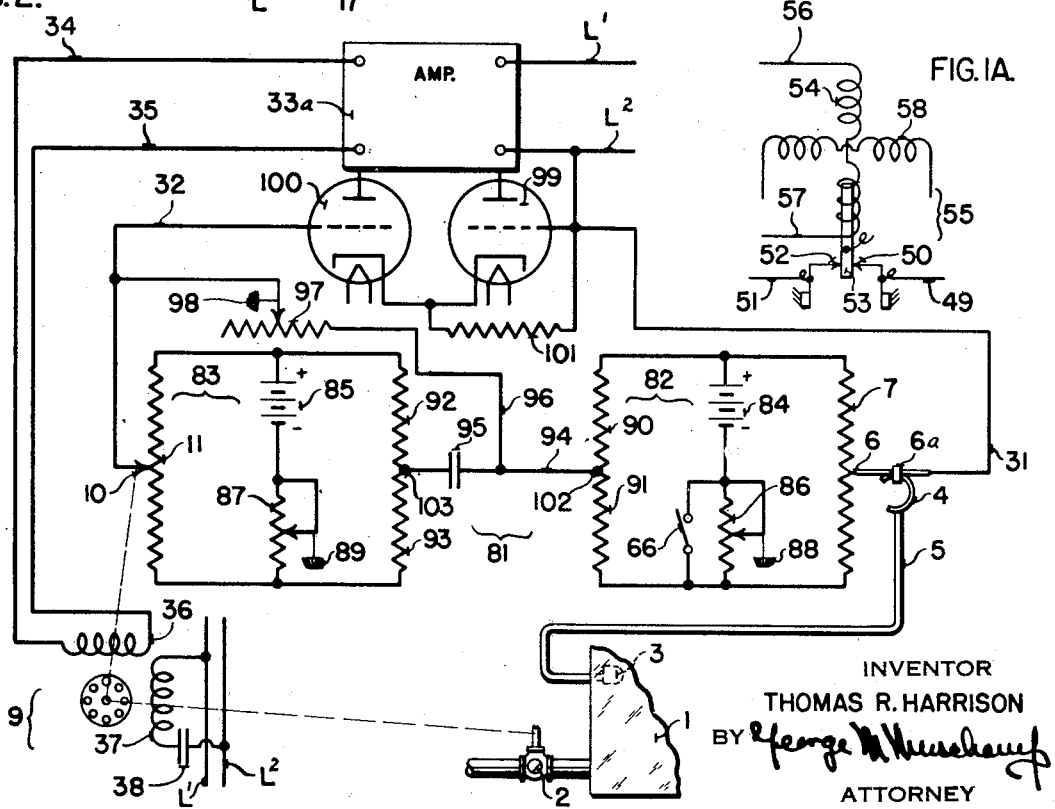
FIG. 2.
INVENTOR
THOMAS R. HARRISON
BY George M. Unselman
ATTORNEY

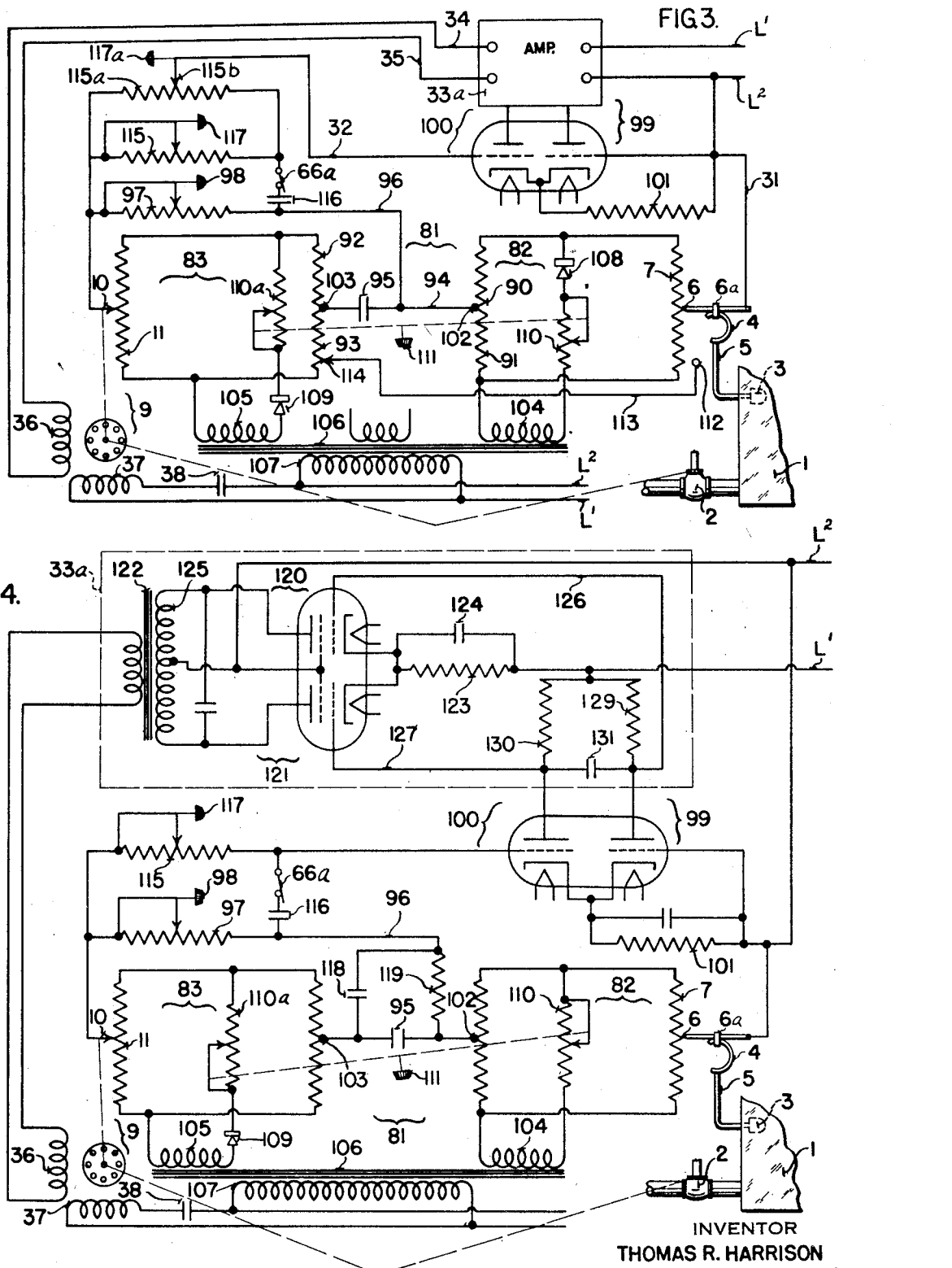

INVENTOR
THOMAS R. HARRISON
BY George N. [signature]
ATTORNEY

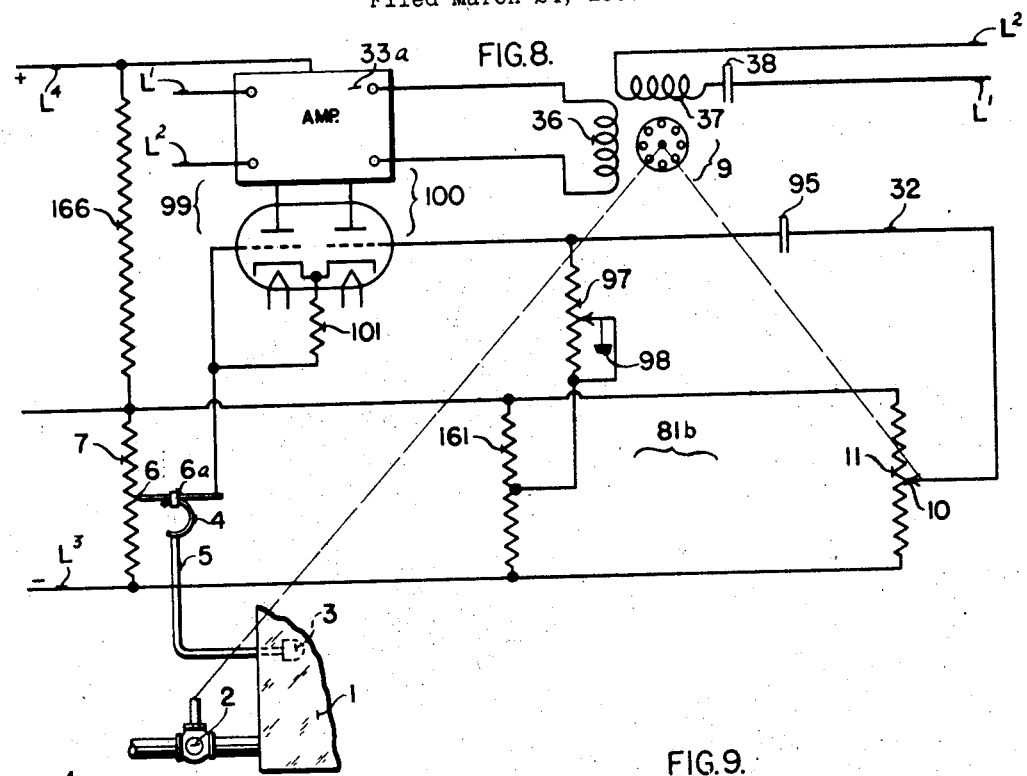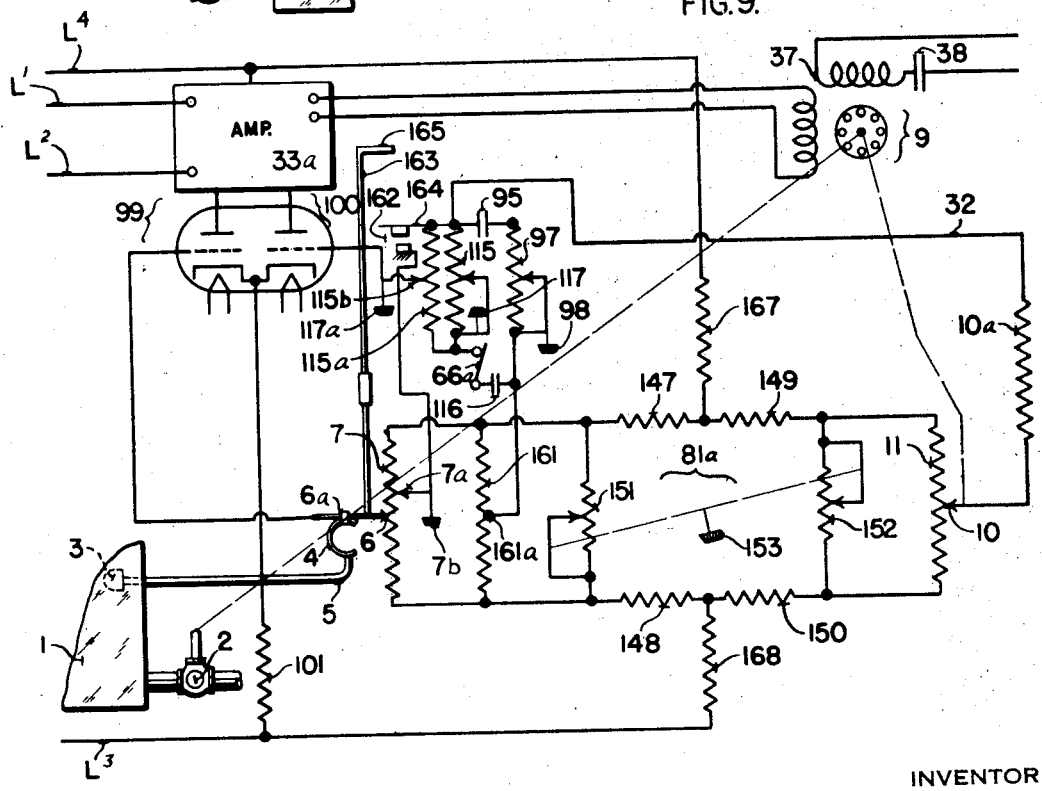

March 2, 1943. T. R. HARRISON 2,312,711
CONTROL APPARATUS
Filed March 24, 1939 5 Sheets-Sheet 5
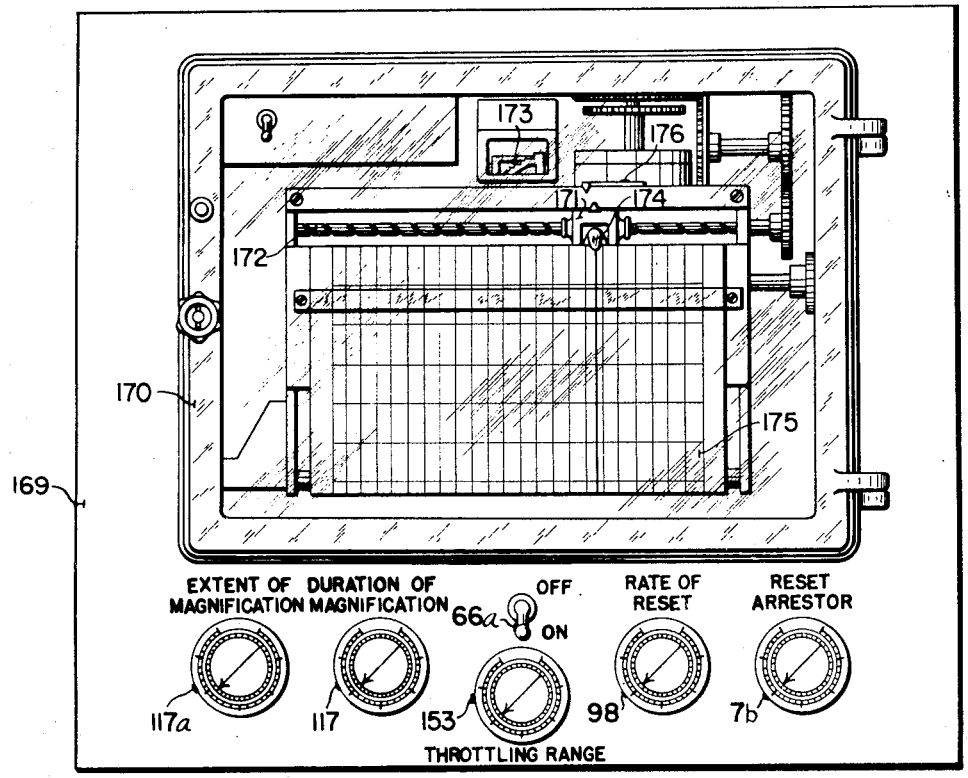
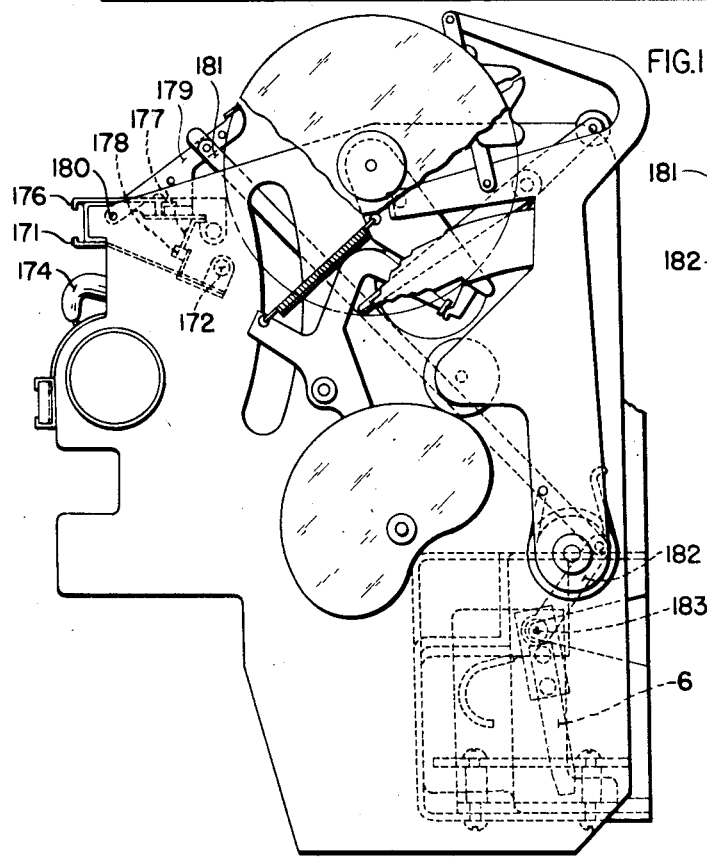
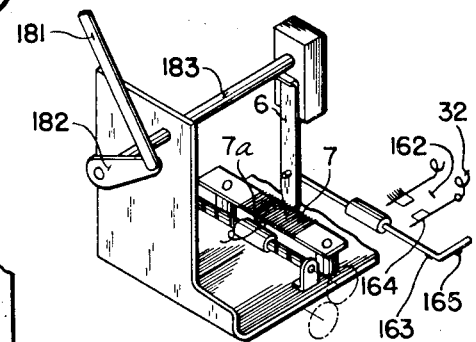
INVENTOR
THOMAS R. HARRISON
BY George M. Ullmchamp
ATTORNEY

UNITED STATES PATENT OFFICE 2,312,711

CONTROL APPARATUS

Thomas R. Harrison, Wyncote, Pa., assignor to The Brown Instrument Company, Philadelphia, Pa., a corporation of Pennsylvania Application March 24, 1939, Serial No. 263,938

40 Claims. (Cl. 236—78)

The present invention relates to electrical control apparatus and more particularly to electrical control apparatus adapted to effect suitable corrective variations in the value of a quantity being controlled, on a departure of the latter from a predetermined normal value, without creating an objectional tendency to unstable control, or hunting.

A general object of the invention is to provide electrical control apparatus adapted on a change in the value of a variable quantity under control to produce a corrective change in the controlling medium to restore the quantity to the desired value in the shortest time possible while avoiding the tendency to hunting.

A specific object of the invention is to provide electrical control apparatus of the character above mentioned having simple and effective means for adjusting it for desirable operation under different conditions of use.

Another specific object of the invention is to provide electrical control apparatus embodying physically stationary means for compensating for variations in the characteristics of the quantity being controlled.

Another specific object of the invention is to provide electrical control apparatus which is adapted, on a change in the value of a variable quantity being controlled, to produce a relatively large initial corrective kick or control effect in the controlling medium, while avoiding the tendency to hunting which would ordinarily result from such a large initial corrective adjustment.

A further and more specific object of the invention is to provide electrical control apparatus embodying physically stationary means for producing a disproportionately strong corrective effect in the supply of the controlling medium during the initial stages of a departure of the quantity being controlled from a desired value while avoiding the tendency to hunting which would ordinarily result from such strong initial corrective effect.

Electrically operated controllers embodying the features of the present invention may take widely different forms and are adapted for use for many different purposes. In general they may be used whenever it is desirable to produce a control effect in response to a change in a control condition or quantity such, for example, as temperature, pressure, flow, liquid level, etc., which tends to vary as a result of the control effect produced.

In accordance with the present invention suitable provisions are made to prevent variations in the quantity being controlled, which variations may be due to changes in the effect of the controlling medium, to changes in the characteristics or amount of the quantity being controlled, or to any other variable conditions. On a change in an operating condition, such, for example, as a change in the B. t. u. content of the fuel supplied to a furnace, or to a change in the furnace load, the furnace temperature will tend to vary, but due to the heat inertia thereof, the change in the operating condition will have been existent for some time before it results in a temperature change that is detected by the apparatus employed to maintain the furnace temperature at a desired value. When thereafter a correction in the amount of fuel supplied the furnace is made by the apparatus referred to in order to restore the furnace temperatue to the desired value, such correction will not be effective to immediately restore the desired condition. This lag is also due to the heat inertia of the furnace. Furthermore, if a sufficiently large correction has been made to restore the furnace temperature to the desired value within a reasonably short time and is maintained until that value is reached, the furnace temperature will tend to overshoot that value and subsequent corrective adjustments will result in hunting or oscillation of the furnace temperature about the desired value.

Accordingly, a primary object of the present invention is to provide electrical control apparatus which is adapted to prevent such hunting or oscillation and effect control or regulation at an even given value.

In a preferred form, the present invention includes provisions for effecting a relatively large initial corrective adjustment in the amount of the controlling medium supplied to maintain the desired condition and thereafter, before the condition has returned to that desired value, removing the initially large corrective adjustment whereby the tendency to hunting, which would ordinarily result from such large initial corrective adjustment, is avoided.

The preferred form of the invention also includes provisions for effecting a so-called "reset" adjustment whereby on a change in an operating condition, such, for example, as a change in the load on a furnace which is being controlled to minimize variations in the furnace temperature, the tendency of the furnace load or other operating condition change to increase or decrease the furnace temperature or other controlling condition may be neutralized.

The preferred form of the invention also includes means for effecting an adjustment in the rate of reset adjustment whereby on a change in furnace load, or other analogous operating condition, the compensating adjustment necessary to the maintenance of the approximately constant value of the furnace temperature or other controlling quantity may be varied to the end that the time required for full compensation for the operating condition change may be reduced to the practical minimum possible without risk of objectionable hunting.

In the preferred form of the invention provisions are also included for readily effecting a so-called "throttling range" adjustment whereby the extent to which the fuel valve or the regulator is adjusted in response to a given change in the furnace temperature or other control quantity may be varied.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a control network diagram illustrating one form of the invention;

Fig. 1A illustrates a modification of a portion of the arrangement of Fig. 1;

Fig. 2 illustrates a modification of the arrangement of Fig. 1 in which physically stationary reset means are employed;

Fig. 3 illustrates another modification of the arrangement of Fig. 1 in which physically stationary means are employed to effect the desired reset and initially large corrective adjustments;

Figs. 4-9 illustrate further modifications of the arrangement of Fig. 1 in which the various physical adjustments of Fig. 1 are effected by physically stationary means;

Fig. 10 is an elevation of a control panel on which a control instrument and associated control devices are mounted;

Fig. 11 is an end elevation of the instrument mechanism of Fig. 10; and

Fig. 12 is a perspective view of automatic switch adjusting means included in the instrument shown in Figs. 10 and 11.

Figure 5:
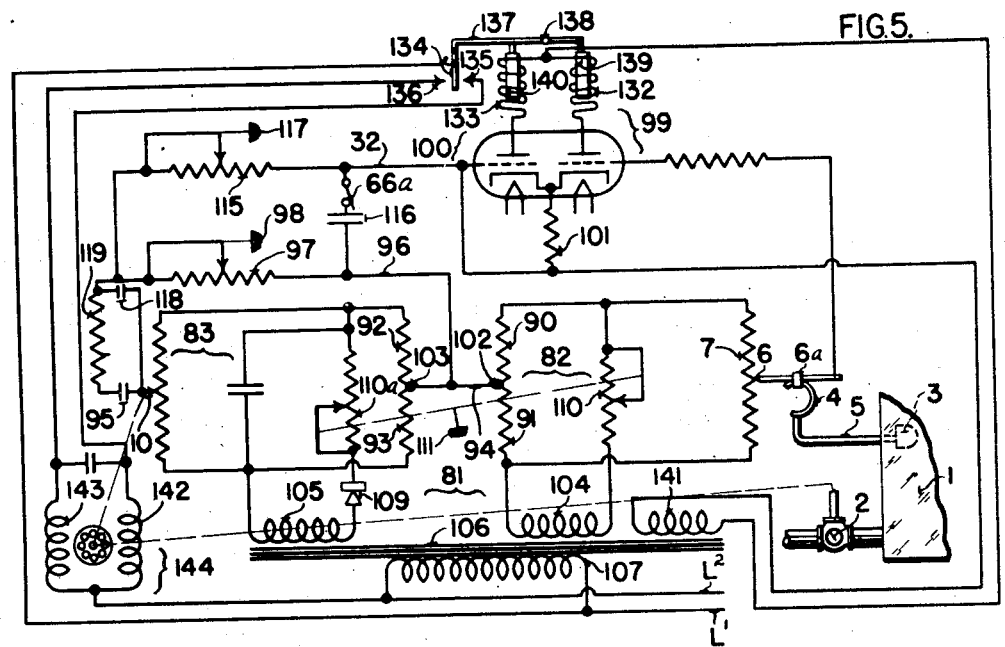

In the embodiment of the invention, illustrated more or less diagrammatically in Fig. 1, the fuel supply to a furnace 1 is regulated by the adjustment of a fuel supply valve 2 in automatic response to variations in the furnace temperature as required to maintain that temperature approximately constant. The furnace temperature is measured by means shown diagrammatically as comprising the bulb 3 of a fluid pressure type thermometer connected to a measuring instrument which includes an actuating element in the form of an arc shaped Bourdon tube 4 to which the thermometer bulb pressure is transmitted by flexible tubing 5. On an increase or decrease in the furnace temperature, the resulting flexure of the Bourdon tube 4 moves a contact 6 along a measuring instrument slidewire resistor 7 up or down as seen in Fig. 1. As shown, the contact 6 is mechanically connected to the Bourdon tube 4 by a strap 6a or by any other suitable means. The initial effect of any movement of the contact 6 is to unbalance a normally balanced electrical control network 8 including the resistor 7 and thereby to energize a reversible electrical control motor 9 for operation in the direction to effect a corrective adjustment of the fuel valve 2 and a corresponding network rebalancing adjustment of a contact 10. The motor 9 is a two-phase rotating field alternating current motor and operates in one direction or the other accordingly as alternating current of one phase or of opposite phase is applied to one of its windings. The shaft of the motor armature is operatively connected to the movable element of the fuel valve 2 and to the contact 10, the latter of which, as shown, is adjustable along a slide-wire resistor 11 included in the electrical control network 8.

As illustrated, the electrical control network 8 is made up of two sections 12 and 13 each of which comprises a Wheatstone bridge network. Section 12 is energized by the connection of its energizing terminals by conductors 14 and 15 to the secondary winding 16 of a transformer 17 having another secondary winding 18 and a line voltage primary winding 19 connected to alternating current supply conductors $L^1$ and $L^2$. An adjustable resistance 20 is inserted in the conductor 15 as shown to permit adjustments of the voltage supplied the bridge network 12. Two opposed arms of the bridge network 12 include the slidewire resistance 7 and the remaining opposed arms are made up of a slidewire resistance 21 along which a contact 22 is adapted to be adjusted.

Similarly, the bridge network 13 is energized by the transformer secondary winding 18 and has its energizing terminals connected thereto by conductors 23 and 24, in the latter of which an adjustable resistance 25 is inserted. The bridge network 13 includes the slidewire resistance 11 in two opposed arms and a slidewire resistance 26, along which a contact 27 is adjustable, in its remaining arms. The contacts 22 and 27 are electrically connected together and are carried at the opposite ends of a rotatable arm 28. The arm 28 is mounted at a point intermediate its ends and is adjusted by a reversible electrical motor 29, the operating circuits for which are described hereinafter, and, on rotation of the motor 29, moves the contacts 22 and 27 in opposite directions along their respective slidewires.

As illustrated, unbalance of the electrical control network 8 is adapted to be detected by an electronic valve 30 which may be a triode including an anode, a cathode, and a control electrode and comprises a part of an amplifier 33 which may be of any well known type. The contact 6 of the control network 8 is connected by a conductor 31 to the cathode of valve 30 and the control electrode of the latter is connected by a conductor 32 to the contact 10 of said network. The valve 30 controls the output current of the amplifier 33 in accordance with the unbalance of the control network 8 so that on unbalance of said network produced by movement of the contact 6 in an upward direction along slidewire 7, the alternating current in the output circuit of the amplifier will be of one phase, and on unbalance of the network 8 produced by downward movement of the contact 6, the said output current will be of opposite phase. The output terminals of the amplifier 33 are connected by conductors 34 and 35 to one phase winding 36 of the motor 9, the other phase winding 37 of which is connected through a suitable condenser 38 to the alternating current supply conductors L¹ and L². The amplifier 33 is so connected and energized that on unbalance of the network 8 in one direction, the output current thereof will be in phase with the voltage of the supply conductors and on unbalance of the network 8 in the opposite direction, the said output current will be displaced 180° with respect to the voltage of the supply conductors. Thus, on unbalance of the network 8 in one direction, the motor 9 will be energized for rotation in the direction to effect a corrective adjustment of the fuel supply valve 2 and a corresponding network rebalancing adjustment of the contact 10 along the slidewire resistance 11. Such an automatic neutralization of an initial control adjustment is sometimes referred to as a follow-up action.

The apparatus illustrated in Fig. 1 includes means for effecting a control range or follow-up adjustment commonly referred to as a throttling range adjustment particularly when the control element is a valve such as the valve 2. The throttling or control range adjustment varies the extent of adjustment of the valve 2 produced by a given movement of the contact 6 along the resistance 7. The extent of the valve adjustment produced by a given change in the adjustment of the contact 6 depends upon the magnitude of the adjustment of the contact 10 along the resistance 11 required to rebalance the control network 8 when the latter is unbalanced by a given change in position of the contact 6. In the form of the invention shown in Fig. 1, the throttling range adjustment is effected by varying the amount of the resistance 25 which is connected in the current supply conductor 24 to the bridge network 13. The resistance 25 may be manually adjusted by the rotation of a throttling adjustment knob 39.

As will be apparent the effect of an increase in the amount of resistance 25 in the conductor 24 is to decrease the voltage supplied the bridge network 13 and thereby to increase the extent of movement of the contact 10 required to rebalance the control network when the latter has been unbalanced by a departure of given magnitude of the contact 6. Similarly, the effect of a decrease in the amount of resistance 25 in the conductor 24 is to increase the voltage supplied the bridge network 13 and thereby to decrease the extent of movement of the contact 10 required to rebalance the control network when the latter has been unbalanced by an adjustment of given magnitude of the contact 6. The relation between the unbalancing movement of the contact 6 and the consequent rebalancing movement of the contact 10 may be kept linear for all throttling rang adjustments of the knob 39, and the sensitivity of the apparatus may be kept substantially constant over the entire range of contact movement.

The apparatus shown in Fig. 1 also includes means for automatically effecting resetting adjustments and thereby compensating for a change in furnace load or other condition which tends to vary the value of the controlling condition which the apparatus tends to maintain. In general, such reset adjustments must be effected slowly if hunting is to be avoided in any control system in which the effect of a change in the control force on the value of the control quantity is delayed, is it may be delayed in furnace control by temperature lag. The latter is dependent upon the heat storage capacity of the furnace, and affects the rate of response of the furnace temperature to a change in the rate of furnace heat supply. A control system effect analogous to that due to temperature lag is produced in different ways, for example, by the inertia of movable machine elements in controlling the operation of machinery, and by the fluid storage capacity of portions of a fluid distribution system in which fluid pressure or rates of flow are controlled.

In the form of the invention illustrated in Fig. 1, such resetting adjustments are effected by the adjustment of the contacts 22 and 27 along their associated resistances 21 and 26 by the reversible motor 29 and may be continuously effected as long as the contact 6 is deflected from the position corresponding to the desired value of the condition. If desired, the resetting adjustments may be effected only when the contact 6 is deflecting from its normal position and eliminated when the contact 6 is being returned to that position. Or, if desired, the resetting adjustments may be effected as long as the contact 6 is deflecting from its normal position or is stationary in a deflected position and eliminated when the contact 6 is being returned to that position. An important advantage in producing the desired reset adjustments when the contact 6 is deflecting or is deflected from its normal position and eliminating those adjustments when the contact 6 is being returned to its normal position, is the elimination of the tendency to hunting which is encountered in certain applications when the reset adjustments are continuously effected as long as the contact 6 is deflected from its normal position.

The reset motor 29 is energized for operation in one direction or the other by the energization of one or the other of its field windings 40 and 41 each of which has one terminal connected to the alternating current supply conductor L². The second terminal of the motor winding 40 is connected by a conductor 42 to a stationary elongated contact 43 and the second terminal of the motor winding 41 is connected by a conductor 44 to a stationary elongated contact 45. The contacts 43 and 45 are electrically insulated from each other and are arranged end to end along different portions of the path of movement of a contact 46. The contacts 43 and 45 have a similar elongated contact 47 and 48, respectively, arranged in parallel therewith. The contact 46 is adjusted by the Bourdon tube 4 in correspondence with the adjustments of the contact 6 and is adapted to electrically connect the contact 43 to the contact 47 when the contact 6 is displaced in the downward direction from the position corresponding to the desired value of the condition. Similarly, the contact 46 is adapted to connect the contact 45 to the contact 48 when the contact 6 is displaced in the upward direction from that position.

The contacts 47 and 48 are connected to the center poles of a double pole double throw switch S and when the switch is thrown to the right, as shown, the contacts 47 and 48 are connected together and to the alternating current supply conductor L¹. In this position of the switch S, one or the other of the windings 40 or 41 of motor 29, depending upon the direction of deflection of contact arm 46, will be continuously energized as long as contact arm 46 is deflected from its normal position and electrically connects contacts 43 and 47 or contacts 45 and 48. The resulting rotation of the motor 29 will be in the direction to create a further unbalance in the network 8 and hence a further rebalancing adjustment of the contact 10 and an additional adjustment of the valve 2 in the corresponding direction. The additional adjustment of the valve 2 is that required to effect a return of the furnace temperature to the desired value and thereby the adjustment of the contact 46 to a position intermediate the elongated contacts 43, 47 and 45, 48 in which position the motor 29 is deenergized.

When it is desired to effect the resetting adjustments of the system only when the contact 6 is being adjusted away from its normal position and to eliminate the resetting adjustments when the contact 6 is being returned to that position, the switch S is adjusted to the left, as seen in Fig. 1. In this position of the switch S it will be noted the contact 47 is connected by a conductor 49 to a stationary contact 50 and the contact 48 is connected by a conductor 51 to a stationary contact 52. The contacts 50 and 52 are arranged on opposite sides of a deflecting member 53, which normally assumes a position intermediate the contacts 50 and 52, but deflects in one direction or the other to engage one or the other of the contacts accordingly as the current in the output circuit of the amplifier 33 is of one phase or of opposite phase. To this end the deflecting member 53 may desirably be carried by the deflecting coil or winding 54 of a dynamometer 55. The winding 54 of the dynamometer 55 is connected by conductors 56 and 57 to the output terminals of the amplifier 33 and, as shown, is connected in parallel to the winding 36 of motor 9. The dynamometer 55 also includes a stationary winding 58 which is connected through a suitable condenser 59 to the alternating current supply conductors $L^1$ and $L^2$ so that when the amplifier output current is of one phase the member 53 will be deflected into engagement with the contact 50 and when the said output current is of opposite phase the member 53 will be deflected into engagement with the contact 52. On such deflection of the member 53, an energizing circuit will be closed to one or the other of windings 40 or 41 of the motor 29 if at that time the contact 46 is deflected from the normal desired position in a direction corresponding to the direction of deflection of the member 53.

To produce the resetting operation when the contact 6 is moving away from the desired position, the dynamometer 55 is so conformed that the member 53 will be deflected into engagement with the contact 52 when the contact 6 is being moved in an upward direction. At that time the contact 46 will bridge the elongated contacts 45 and 48 and consequently energization of the winding 41 of motor 29 will be effected. The resulting rotation of the motor 29 will be in the direction to create a further unbalance in the network 8 and hence a further rebalancing upward movement of the contact 10 and an additional closing adjustment of the valve 2. The additional closing adjustment of the valve 2 effected is that required to effect a return of the furnace temperature to the desired value and thereby the adjustment of the contact 6 to a position corresponding to that desired value. On such return movement of the contact 6 to the desired position, it is noted the reset motor 29 is deenergized since the member 53 of the dynamometer 55 will then be deflected into engagement with the contact 50. Accordingly, on such return adjustment of the contact 6, the valve 2 will be given an opening movement of extent corresponding only to the follow-up movement of the contact 10 required to rebalance the network 8 before the resetting operation was effected and therefore less the closing movement by an amount corresponding to the amount of reset.

If it is desired to effect the resetting operation when the contact 6 is moving toward the normal desired position, as may be desirable in a slowly cooling and rapidly heating process, the dynamometer 55 is so conformed that when the contact arms 6 and 46 are being adjusted away from their normal positions, the reset motor 29 will be inactive, and accordingly the valve 2 will initially be given a closing adjustment, on an increase in temperature, of an amount required to balance the network 8. On return of the furnace temperature to the desired value, however, the reset motor 29 will be energized for rotation in the direction tending to reduce the unbalance of network 8 and hence a smaller adjustment of contact 10 along resistance 11 will be sufficient to rebalance the network. Thus, in this case also, the valve 2 will be opened an amount less than the closing adjustment by an amount corresponding to the extent of reset.

As will be understood, the speed characteristic of the reset motor 29 and the ratio of reset motor motion to motion of the contacts 22 and 27 should be chosen so as to be suitable for an average or normal full compensating period which varies with the character of the operation controlled. For example, it may be five minutes with one furnace and twenty minutes with another. In general, the operation of the valve motor 9 directly due to adjustment of the contact 6 will be effected much more quickly than that directly due to the adjustment of contacts 22 and 27.

In the form of the apparatus thus far described wherein the resetting adjustments are effected only when the contact 6 is departing from its normal position, it is possible for the system to stabilize with the contact 6 at a position displaced from the desired position. In order to guard against this contingency the contacts 50 and 52 may be normally held into engagement with the deflecting arm 53 of the dynamometer 55 by spring or other means as illustrated in Fig. 1A so that whenever the contact arms 6 and 46 stabilize away from their normal positions the reset motor 29 will be energized. When the contact arms 6 and 46 are departing from or returning to their normal positions, the arm 53 will move out of engagement with one of the contacts 50 or 52 and deflect the other contact against the opposing force of the spring means carrying that contact. Thus, it will be apparent, that with the modification illustrated in Fig. 1A the resetting adjustments of the system may be eliminated when the contact 6 is either departing from or moving towards its desired position and effected during the remainder of the time in which the contact 6 is deflected from its normal position.

An alternative arrangement has been illustrated in Fig. 1 for preventing the stabilization of the system with the contact 6 displaced from the desired position wherein provisions have been made to periodically close an auxiliary circuit to the reset motor 29, which circuit will be effective whenever the contact 46 is displaced from the desired position intermediate the elongated contacts 43, 47 and 45, 48. To this end the center tap of a suitable resistance 60, which has its terminals connected to a respective contact 50 and 52 of the dynamometer 55, is connected by a conductor 61 to the supply conductor L¹. A switch 62 adapted to be alternately moved to its open and closed positions is inserted in the conductor 61 and operates to alternately energize and deenergize the auxiliary circuit to the motor 29 referred to above. As shown, a cam 63 driven by a continuously rotating unidirectional motor 64 and in cooperative relation with the switch 62 is provided to alternately and periodically actuate the latter to its open and closed positions to effect such operation. With this arrangement, as in the modification shown in Fig. 1A, it will be apparent the system can never stabilize until the contact 46 has returned to the desired position intermediate the elongated contacts 43, 47 and 45, 48.

The apparatus illustrated in Fig. 1 also includes provisions for effecting an initially large corrective adjustment in the setting of the fuel valve 2 on a change in the furnace temperature from the desired value. This initially large corrective adjustment is removed before the furnace temperature has returned to the desired value to the end that the tendency to hunting which would otherwise result from such large corrective adjustment is eliminated.

In the form of the invention illustrated in Fig. 1 such initial over-adjustment of the fuel valve 2 is effected by varying the amount of resistance 20 which is connected in the electrical current supply conductor 15 to the bridge network 12. The resistance 20 may be manually adjusted by the rotation of a knob 65 and is adapted to be shunted by a switch 66, to be described, while the contact 6 is moving away from the position corresponding to the normal desired temperature. The shunt connection about resistance 20 is removed as soon as the contact 6 begins to return to that position.

As illustrated, the switch 66 comprises an elongated member 67 which is suspended by spring means 68 and 69 adjacent and parallel to the slidewire resistance 7. Such suspension provisions are made to permit longitudinal adjustment of the member 67 in one direction or the other relatively to the slidewire resistance 7 on deflection of the contact 6 from its desired position. To this end a shoe 70 carried by the Bourdon tube 4 is arranged in frictional engagement with a surface of the member 67 so that on expansion or contraction of the tube 4 the member 67 will be adjusted against the opposing action of the spring means 68 and 69 in one direction or the other. The friction exerted by shoe 70 on member 67 is so adjusted as to maintain the member 67 in its deflected position against the opposing action of the spring means 68 and 69 when the tube 4 is not expanding or contracting.

Electrical contacting arms 71 and 72 are mounted on opposite ends of the member 67 and are insulated from each other. The contacting arms 71 and 72 are arranged in cooperative relation with a respective stationary contact 73 and 74, which are electrically connected by a conductor 75, and are out of engagement with said stationary contacts when the member 67 is in its undeflected position. On movement of the member 67 is a downward direction, as seen in Fig. 1, the contacting arm 71 will engage the contact 73 and on movement of the member 67 in an upward direction the contacting arm 72 will engage the contact 74.

As shown, the contacts 71 and 72 are electrically connected to a respective one of a pair of elongated contacts 76 and 77 which are arranged end to end adjacent and parallel to the slidewire resistance 7. The adjacent ends of contacts 76 and 77 are separated from each other by a suitably small distance, preferably slightly more than the width of a contact 78. Contact 78 is carried by the Bourdon tube 4 and is adapted to engage one or the other of the contacts 76 and 77 as the tube 4 expands and contracts. The contact 78 is connected by a conductor 79 to one terminal of the resistance 20, and the conductor 75 which joins the contacts 73 and 74 is connected by a conductor 80 to the other terminal of the resistance 20.

When the contact 78 is displaced in the upward direction from the position intermediate the contacts 76 and 77 and the member 67 is also displaced in the same direction from its undeflected position, a low resistance shunt circuit will be established about the resistance 20. This shunt circuit may be traced from one terminal of the resistance 20 to conductor 79, contact 78, contact 77, contact arm 72, contact 74, conductor 75, and conductor 80 to the other terminal of the resistance. Similarly, when the contact 78 and the member 67 are displaced downwardly from their undeflected positions, a low resistance shunt will be closed about the resistance 20 from one terminal of resistance 20 to conductor 79, contact 78, contact 76, contact arm 71, contact 73, and conductors 75 and 80 to the other terminal of the resistance. It will be noted that when the member 67 and contact 78 are deflected in opposite directions from their normal positions, as will be the case when the furnace temperature is returning to the desired value, the shunt circuit about the resistance 20 cannot be closed. For the condition when one or the other of the elements 67 or 78 is in its undeflected position and the other element is deflected from that position, as may possibly be the case when the furnace temperature is at the desired value, the shunt circuit about the resistance 20 cannot be closed.

The effect of closing the shunt circuit described about resistance 20 is to increase the voltage supplied the bridge network 12 and thereby to increase the extent of movement of the contact 10 along resistance 11 required to rebalance the control network 8. The extent to which the unbalance of the network 8 is so increased is dependent upon the adjustment of the knob 65. Thus, with the arrangement described, as long as the contact 6 is moving away from the position corresponding to the desired furnace temperature value and has not started back to that position, the network 8 will be unbalanced to a greater extent than it would be by the movement of the contact 6 alone, and accordingly the valve 2 will initially be adjusted a corresponding additional amount.

The effect of such initial magnified corrective adjustment of the valve 2 is to make the new rate of fuel supply to the furnace significantly higher or lower than the new rate of heat output, accordingly as the furnace temperature is lower or higher than the desired value. Subsequently, when the furnace temperature begins to return to the desired value, the magnification of the correction provided is reduced and hence any tendency to overshooting of the desired temperature value is avoided. With this apparatus, therefore, a large initial effect, calculated to arrest and reverse the trend of the condition, is obtained which is reduced in response to the subsequent trend of the condition and is combined with the follow-up and resetting actions previously described.

In some cases it may be desirable or necessary to effect the reduction of the magnification of the corrective adjustment of the valve 2 at an earlier point in the furnace temperature cycle of variation in order to effect suitably fast restoration of the furnace temperature to the desired value while avoiding any tendency to hunting. Such operation may be obtained with the apparatus of Fig. 1 with slight modification, namely, suitable reduction in the degree of friction between the friction shoe 70 and the member 67 relatively to the tension and compression strength of the spring means 68 and 69. For example, the degree of friction between the shoe 70 and the member 67 may be adjusted by applying a suitable viscous lubricant to the surface of member 67. With such a modified arrangement, when the contact 6 is moving faster than a predetermined minimum rate away from its desired position the member 67 will be deflected in the same direction in which the contact 6 is moving, but when the movement of contact 6 falls below that minimum rate the equalizing action of the springs 68 and 69 will return the member 67 to its undeflected position and thereby effect a reduction in the voltage applied the bridge 12 by opening the shunt circuit about the resistance 20. Thus, the magnification in the corrective adjustment of valve 2 effected as a result of shunting of resistance 20 will be removed as soon as the rate of movement of the contact 6 away from its desired position falls below a predetermined minimum value.

With the apparatus shown in Fig. 1 operating with furnace heat output and input exactly equal with the furnace temperature at its normal value, if there should be a particular change, for example, an increase in the furnace heat output, followed by a prolonged period of operation in which no further change in the rate of heat output occurs, it will be apparent the operating effect of the control apparatus described will be such as to produce the following results: an initial adjustment of the valve 2 which increases the fuel supply to make the new rate of furnace heat supply significantly higher than the new rate of heat output; a subsequent control effect tending to suddenly reduce the rate of heat input; and as the furnace temperature returns to the desired value a compensating adjustment in the rate of heat input which tends to neutralize or cancel out a portion or all of the remaining portion of the initial adjustment of the valve 2 depending upon the magnitude of the reset adjustment required to maintain the furnace temperature at the desired value with the new rate of heat output.

For the particular operating conditions described above it may be assumed that the ideal calibration of the control apparatus would be that which would return the furnace temperature to its normal value in the shortest possible time. In practice, however, the control quantity, namely, the furnace temperature in the apparatus shown in Fig. 1, is subject to fluctuation as a result of rapid change in furnace load or some other operating condition so that a new adjustment of the valve 2 is apt to occur before the follow-up and compensating adjustments resulting from a previous change in the control quantity have been completed. In practice, therefore, the adjustment of the various circuit constants may not and usually will not be precisely those which would be ideal for any one assumed particular instantaneous change in the control quantity. The apparatus shown in Fig. 1 permits by suitable adjustment of the resistances 20 and 25 of a wide range of variation in the control system characteristics thereby permitting a desirably good regulation under very different conditions of control operation.

In Fig. 2 I have illustrated, more or less diagrammatically, a modification of the arrangement of Fig. 1 which includes physically stationary means for controlling the resetting adjustments of the valve 2 to compensate for changes in the furnace load or other operating conditions which tend to vary the value of the quantity it is desired to maintain constant.

In the control system illustrated in Fig. 2, an electrical control network 81 is employed in lieu of the control network 8 of Fig. 1 and the resetting provisions of Fig. 1 have been replaced by physically stationary means included in the network 81 and adapted to produce the same result. The control network 81 is made up of two sections each of which comprises a Wheatstone bridge indicated by the reference numerals 82 and 83. The Wheatstone bridges 82 and 83 are energized by a respective battery 84 and 85. A resistance 86 is connected in the energizing connection to the bridge network 82 and a resistance 87 is connected in the energizing connection to the bridge network 83. The resistance 86 is adjustable, as, for example, by a knob 88 and is provided for effecting the desired initial magnification of the corrective adjustment of the fuel valve 2. The resistance 86 is adapted to be short circuited by means of a switch 66 which may be identical to and actuated in the same manner as the correspondingly identified part of Fig. 1, but has been only shown schematically in Fig. 2 in order not to confuse the drawing. The resistance 87 is adjustable by a knob 89 and is provided to permit throttling range adjustments of the network 81.

As illustrated, the bridge network 82 includes the slidewire resistance 7 in two of its opposed arms and along which the contact 6 carried by the Bourdon tube 4 is adapted to move. The remaining arms of the network 82 are made up of fixed resistances 90 and 91. The bridge network 83 includes the slidewire resistance 11, along which the contact 10 is adapted to move, in two of its opposed arms and fixed resistances 92 and 93 in its remaining arms. The point of engagement of the resistances 90 and 91 is connected by a conductor 94 in which a condenser 95 is inserted to the point of engagement of the resistances 92 and 93. The point of engagement of the resistances 90 and 91 is also connected to the contact 10 of the network 83 by a conductor 96 in which a high resistance 97 is inserted. The resistance 97 may be adjustable by a knob 98.

In this form of my invention unbalance of the electrical control network 81 is adapted to be detected by a pair of electronic valves 99 and 100, both of which may comprise triodes having an anode, a cathode and a control electrode. The cathodes of the valves 99 and 100 are connected together and through a biasing resistance 101 to one input terminal of a suitable amplifier 33a and to the contact 6 of the bridge network 82. The anodes of the valves 99 and 100 are connected to the remaining input terminals of the amplifier 33a. The control electrode of the valve 99 is connected directly to the negative terminal of the biasing resistance 101 and the control electrode of the valve 100 is connected to that terminal through the control network 81. With this arrangement it will thus be apparent the potential of the control electrode of the valve 100 is adapted to be varied in accordance with the unbalance of the control network 81, and that the potential of the control electrode of valve 99 is adapted to be maintained relatively constant.

The amplifier 33a may be of any well known type and may be identical to the amplifier 33a described hereinafter in connection with Fig. 4 and is adapted to supply alternating current, in phase with or displaced 180° in phase with respect to the voltage of the supply detectors L¹ and L², to the winding 36 of motor 9 accordingly as the conductivity of the valve 100 rises above or falls below the conductivity of the valve 99. When the control network 81 is in a balanced condition, the conductivities of the triodes 99 and 100 will be approximately equal and for that condition the output current of the amplifier 33a will be zero.

In Fig. 2, as in the arrangement of Fig. 1, the initial effect of a furnace temperature change is to unbalance the control network 81 so as to create a difference in potential between the contacts 6 and 10. In Fig. 2, however, this difference in potential is unidirectional since direct current is employed to energize the networks 82 and 83. When the polarities of the batteries are that shown, an increase in furnace temperature and a subsequent upward adjustment of the contact 6 effects an increase of the potential of the contact 6 in the positive direction with respect to the potential of the contact 10. This will increase the potential of the control electrode of the valve 100 in the negative direction to thereby reduce the conductivity of that valve and effect the supply of alternating current to the motor winding 36 of the correct phase to produce operation of the motor 9 in the direction to give an upward rebalancing adjustment to the contact 10 and a closing adjustment to the fuel valve 2. Similarly, a decrease in furnace temperature and a subsequent downward adjustment of the contact 6 will operate to increase the conductivity of the valve 100 with respect to that of the valve 99 to thereby produce energization of the motor 9 for rotation in the direction to effect a downward rebalancing movement of the contact 10 and an opening adjustment of the valve 2.

In this embodiment of my invention, the rebalancing adjustments of the contact 10, produced as described above, are not continuous in their effect when the contact 6 is displaced from its normal position, but gradually diminish, and if no further adjustments were made, would disappear entirely. This phenomenon occurs as a result of the connection of the condenser 95 and resistance 97 as shown and is employed as described hereinafter to effect the desired resetting adjustments of the control apparatus of Fig. 2.

With the furnace operating condition such that the control network 81 has been balanced for an appreciable length of time with the contacts 6 and 10 at intermediate points along their respective slidewires, it will be seen that the difference in potential between the contact 6 and the bridge point 102 will be zero. The difference in potential between the point of engagement of the bridge resistances 92 and 93, indicated by the reference numeral 103, and the contact 10 will also be zero. Therefore, there will then be no charge on the condenser 95 and since the difference in potential between the contact 10 and the bridge point 103 is zero, the current flow through resistance 97 will be zero whereby the potential drop across that resistance will be zero.

On a change in the furnace heat output, for example, on an increase in the heat output followed by a prolonged period in which no further change in the rate of heat output occurs, the furnace temperature will decrease and subsequently the Bourdon tube 4 will effect a downward adjustment of contact 6 along resistance 7. Such adjustment of the contact 6 will effect a reduction in the negative potential applied to the control electrode of valve 100 and thereby produce energization of the motor for operation in the direction to give a rebalancing adjustment of the contact 10 in a downward direction and an opening adjustment of the valve 2. That rebalancing adjustment of the contact 10 is not permanent in its effect, as noted hereinbefore, because of the flow of charging current to the condenser 95 through the high resistance 97 produced by the establishment of a difference in potential between the contact 10 and the bridge junction 103. This charging current gradually produces a potential across the condenser 95, which potential is in opposition to that between the contact 10 and the junction 103, and thereby gradually reduces the effectiveness of the rebalancing adjustment of the contact 10.

As the rebalancing effectiveness of the adjustment of the contact 10 is thus reduced, the motor 9 will again be energized for rotation in the same direction to effect a further adjustment of the contact 10 to compensate for that reduction. The potential on the condenser 95 will continue building up, however, as long as the contact 6 is displaced from its normal position. The motor 9 and thereby the contact 10 will therefore creep along in the direction of the initial adjustment as long as this operative condition obtains to tend to maintain the balance of the network 81 and to give an additional opening adjustment to the valve 2.

It will thus be noted the establishment of a potential on the condenser 95 produces the precise effect produced by movement of the contacts 22 and 27 along their respective slidewire resistance 21 and 26 in the Fig. 1 arrangement. In Fig. 2, however, as noted above the charging of condenser 95 is continuous as long as contact 6 is displaced from its desired position and, hence, the rebalancing adjustment of the contact 10 is continuous until the contact 6 has returned to that position.

The rate at which such a potential is built up on the condenser 95 is determined by several factors including the extent of departure of the contact 6 from its desired position and thereby of the contact 10, the capacity of the condenser 95, and the magnitude of resistance 97. In accordance with the present invention, that rate is desirably slow so that on an initial adjustment of the contact 6, the total effect of the charging of the condenser 95 during the time of displacement of the contact 6 from its desired position is only such as to compensate for the initial furnace characteristic change which caused the reduction in temperature.

When the contact 6 begins to return to its normal position, the network 81 will be unbalanced in the opposite direction, and the motor 9 will consequently be energized for rotation in the opposite direction to move the contact 10 back towards its initial position and to effect a closing adjustment of the valve 2. It is noted that during such return adjustment of the contact 6, the condenser 95 continues to charge in the same direction as before. Thus, when the contact 6 reaches its normal position, a potential will have been built up on the condenser 95 which will be of a magnitude determined by the extent and duration of deflection of the contact 6 from its normal position. As will be apparent, in order for the control network 81 to assume a stable condition for the new furnace conditions, that potential on the condenser 95 must be compensated for or balanced out. This end is obtained in this form of my invention, as in the arrangement of Fig. 1, by the contact 10 coming to rest at a point short of its initial position. At this point the potential between the contact 10 and junction 103 will be exactly equal and opposite to the potential on the condenser 95.

The system of Fig. 2 will then stabilize, if no further change in the furnace operating conditions has occurred meanwhile, with fuel being supplied to the furnace at a new and higher rate determined by the extent and duration of departure of the contact 6 from its normal position. It will be apparent that for the case of decreased heat output of the furnace, the control apparatus of Fig. 2 will effect a reduction in the supply of heat to the furnace to thereby return and maintain the furnace temperature at the desired value. It is thus seen the adjustment effected by the motor 9 is a true compensating adjustment making it possible to maintain approximately the same furnace temperature notwithstanding changes in the furnace load, for example, as may result from substantial changes in amount of material heated in the furnace, and furthermore has temporarily provided an additional corrective effect in the supply of heat to the furnace to thereby quickly return the furnace temperature to the desired value. In this connection it is noted the actuation of switch 66, as described hereinbefore, produces a magnification in the corrective effect in the heat supply during the initial stages of the furnace temperature departure with the result that the furnace temperature is returned in the shortest time possible to its desired value.

In the governing or control system of the general character shown in Fig. 2, the rate at which compensating adjustments are effected must be suitably related to the constants, and particularly the time lag constant of the apparatus or process controlled, if hunting is to be avoided. In the arrangement of Fig. 2 the rate at which the fuel valve 2 is adjusted while the contact 6 is displaced from its normal position may be controlled in a number of different ways, for example, by adjustments of the resistance 97, the bridge resistance values, the relative currents drawn from the batteries 84 and 85, and the capacity of condenser 95. As one such means, I have illustrated the resistance 97 as adjustable by a knob 98, the effect of adjustment of which is to vary the charging rate of condenser 95 and thereby the speed of motor 9 on a given deflection of contact 6 from its normal position.

It is noted that, with the control apparatus of Fig. 2, if the furnace is manually shut down for short periods by the closing of additional fuel supply valve means not shown, as for example, in a periodic process, the cooling of the furnace will produce a downward adjustment of the contact 6 and if the control network 81 is maintained energized during the periods of shut down, a follow-up adjustment of the contact 10 in a downward direction will be effected. Thereafter a charge will begin to be established on the condenser 95 and as noted hereinbefore this charge will tend to produce a further downward adjustment of the contact 10 if the latter is not already in its extreme low position. The potential on the condenser 95 will continue to build up even after the contact 10 has reached its extreme low position until the condenser potential has become equal in magnitude to the potential between the contact 10 and the bridge junction 103. If the time of furnace shut down is short and the rate of furnace temperature rise suitably fast, the magnitude of the charge on condenser 95 and thereby the extent of adjustment of the contact 10 and valve 2 will not be significant, but if the time of shut down is appreciable or the rate of furnace temperature rise is slow, the charge on the condenser 95 may become equal and opposite to the potential between the contact 10 and the bridge junction 103 even though the contact 10 is in its extreme low position. Furthermore, even if the network 81 is deenergized while the furnace is shut down, and energized when the furnace is started up, if the rate of furnace temperature rise is very slow, the potential on condenser 95 may build up to a value which is equal and opposite to the potential between the contact 10 and the bridge junction 103 before the contact 10 begins to move upward.

In either of the cases above mentioned the effect of the establishment of such a potential on condenser 95 is to delay the follow-up adjustment of the contact 10 in an upward direction and thereby the closing adjustment of valve 2 until the contact 6 has reached the position corresponding to the normal desired temperature. Thus, although the furnace temperature is rising, the control apparatus of Fig. 2 will be insensitive to that rise until the contact 6 has reached and passed its normal, desired position.

The effect of such insensitivity of the control apparatus is to permit the supply of more fuel to the furnace than is needed to bring the temperature to the desired value and hence to produce overshooting and objectionable hunting.

One means of avoiding this condition is to leave the control network 81 deenergized until the contact 6 has nearly reached its desired position.

In Fig. 3 I have illustrated, more or less diagrammatically, a modification of the arrangement of Fig. 2 embodying provisions for eliminating the undesirable insensitivity of that arrangement as described, and hence, for minimizing the tendency to hunting when first heating up the furnace. In Fig. 3 also means alternative to the means shown in Fig. 2 for energizing the bridge networks 82 and 83 and other features to be described have been illustrated.

As illustrated, energizing current is supplied th; Wheatstone bridge networks 82 and 83 of the arrangement of Fig. 3 from the secondary windings 104 and 105, respectively of a transformer 106 having a line voltage primary winding 107, the terminals of which are connected to the alternating current supply conductors L¹ and L². A half-wave rectifier 108 is inserted in the energizing connection to the bridge network 82 and a half-wave rectifier 109 is inserted in the energizing connection to the bridge network 83. Thus, in this arrangement, the bridge networks are energized by pulsating direct current. If desired, suitable filters may also be employed to produce steady direct currents for energizing the bridge networks. A resistance 110 and a resistance 110a which are simultaneously adjustable in opposite directions, as for example, by a knob 111, are connected in the energizing connections to the bridge networks 82 and 83, respectively, and are provided for effecting throttling range adjustments of the system.

The provisions referred to hereinbefore for eliminating the undesirable insensitivity of the control apparatus of Fig. 2 when the contact 6 has been maintained in its lowest temperature position for an appreciable period include means for preventing the establishment or maintenance of a significant potential on the condenser 95 whenever the contact 6 is in that position. The means referred to above include a contact 112 arranged in the path of the movement of the contact 6 and positioned at a suitably low temperature position of the latter. The contact 112 is connected by a conductor 113 to a junction 114 at the lower end of resistance 93, as seen in Fig. 3.

The effect of engagement of contacts 6 and 112 is to create a shunt about the bridge network 82 and the condenser 95 and thereby to eliminate the unbalance effects of the latter, and to establish a circuit to discharge the condenser 95 to thereby prevent the establishment of a potential of significant value thereon. When the unbalance effects of the bridge network 82 and condenser 95 are so eliminated, the contact 10 will come to rest at a position along the slidewire 11 which is at the same potential as the contact 114. Accordingly, the position of the contact 114 is preferably so chosen that the valve 2 will then be in its fully opened position.

As will be apparent, the effect of preventing the establishment or maintenance of a potential of significant value on the condenser 95 while the contact 6 is in engagement with the contact 112 is to permit immediate upward adjustment of the contact 10 and thereby adjustment of the valve 2 towards its closed position on movement of the contact 6 towards its normal, desired position. Thus, it will be apparent the sensitivity of the control apparatus of Fig. 3 will not be impaired even if the contact 6 has been maintained in engagement with the contact 112 and the network 81 has remained energized for an unusually long period of time, and hence the tendency to objectionable hunting after such an occurrence is eliminated.

In addition to the provisions described above, I have illustrated in Fig. 3 an arrangement alternative to that shown in Figs. 1 and 2 for effecting an initial magnification of the corrective adjustment of the fuel valve 2, on a departure of the contact 6 from its normal position, to return the furnace temperature to the desired value in the shortest possible time while minimizing the tendency to hunting.

The initial magnification of the corrective adjustment of the fuel valve 2 produced by the apparatus of Fig. 3 is obtained by temporarily reducing the effectiveness of rebalancing adjustments of the contact 10 along the slidewire resistance 11 whereby a magnified adjustment of the contact 10 and the valve 2 is effected. This temporary reduction in the effectiveness of rebalancing adjustments of the contact 10 is produced by a pair of parallel connected resistances 115 and 115a and a condenser 116. If desired, a manually operable switch 66a may be inserted in circuit with the condenser 116 to eliminate the initial magnification in the adjustment of the contact 10 and the valve 2.

As shown, the circuit part including resistances 115 and 115a and condenser 116 is connected in shunt to the resistance 97. The resistance 115 may be varied in magnitude by adjustment of a knob 117, and the resistance 115a has associated therewith a contact 115b which is adjustable along the length thereof by a knob 117a. One terminal of the parallel connected resistances 115 and 115a is connected to the terminal of resistance 97 which is connected to the contact 10 and the other terminal of that parallel resistance connection is connected by the switch 66a and the condenser 116 to the other terminal of resistance 97. The contact 115b is connected by the conductor 32 to the control electrode of the valve 100. It will be noted that the condenser 116 and a portion of resistance 115a depending upon the adjustment of contact 115b are connected between the junction 102 of bridge 82 and the control electrode of valve 100.

The connection of the condenser 116 and part of resistance 115a between the bridge junction 102 and the control electrode of valve 100 tends initially to subdue changes in the potential between the junction 102 and the control electrode of valve 100 in response to adjustments of the contact 10. Accordingly, contact 10 will initially be given a magnified adjustment in effecting an instantaneous rebalance of the network 81. Specifically, when the switch 66a is in its closed position, only a fraction of the effect of the rebalancing adjustments of the contact 10 along its associated slidewire 11 will initially be effective to change the potential of the control electrode of valve 100, the magnitude of that fraction depending upon the adjustment of contact 115b along resistance 115a. As will be apparent, an adjustment of the contact 10 along the slidewire 11 will cause a flow of charging current through the parallel resistances 115 and 115a to the condenser 116 to thereby build up a potential on that condenser which is of polarity opposite to that between the contact 6 and the bridge junction 102. That flow of charging current through resistance 115a will produce a potential drop thereacross which is of the same polarity as the potential being established on condenser 116. Since the condenser 116 and the portion of resistance 115a to the right of contact 115b are connected between the bridge junction 102 and the control electrode of valve 100, as noted hereinbefore, it will be apparent the network 81 will be stabilized at any instant when the sum of the potential on the condenser 116 and the potential drop across the portion of resistance 115a referred to is exactly equal and opposite to the potential between the contact 6 and the bridge junction 102.

It is noted that during the initial stages of an adjustment of the contact 10 in response to an adjustment of the contact 6, the magnification in that adjustment will be determined principally by the position of contact 115b along the resistance 115a and will be proportional to the ratio of the total resistance of resistance 115a to the portion of resistance 115 to the right of contact 115b. Thereafter, a potential is gradually built up on condenser 116 and the charging current through resistance 115a gradually decreases in value. The effect of reduction in the flow of charging current through resistance 115a is the same as adjustment of the contact 115b toward the left along resistance 115a so that as the charging current gradually decreases and the potential on condenser 116 gradually increases the potential of the contact 115b will gradually approach that of the contact 10 and those contacts will be at the same potential when the charging current flow through resistance 115a is zero. The potential on the condenser 116 will then be exactly equal and opposite to that between the bridge junction 102 and the contact 6. As will be noted, the magnification in the adjustment of the contact 10 will have been reduced to unity during this process and accordingly the contact 10 will have been returned to its true follow-up position.

Similarly, on a return adjustment of the contact 6 to its desired position the contact 10 will immediately be given a magnified return adjustment to its initial position and thereafter the magnification in that adjustment will gradually be removed.

In the foregoing explanation of the operation of the apparatus of Fig. 3, the condition considered has been that wherein the contact 6 is given an adjustment away from its desired position and then remains stationary until returned to the desired position. It will be apparent, however, that in practice the adjustments of the contact 6 are ordinarily gradual. If the contact 6 is adjusted slowly and continuously in the same direction, the tendency for the magnification in the adjustment of the contact 10 to build up to its maximum value will be decreased by the potential which is permitted to build up on the condenser 116 and accordingly the magnification will assume an intermediate value determined by the rate of adjustment of the contact 6. The magnification of the adjustment of the contact 10 will thus vary in proportion to the rate of adjustment of the contact 6 and will be larger when the rate of adjustment of the contact 6 is larger since the potential on the condenser 116 will not have time to build up to the same relative extent on rapid adjustments of the contact 6 that it will on slow adjustments of that contact.

The effective magnification in the adjustment of the contact 10 obtained is thus seen to be one which may be expressed mathematically in terms of rate of change since the magnitude of the magnification obtained is proportional to the rate of the change in the condition being controlled.

It is noted that when the speed of adjustment of the contact 10 is suitably slow by virtue of suitable gearing between the motor 9 and the valve 2 and the contact 10, the time of adjustment thereof may be relied upon to limit the initial magnified adjustments of the contact 10 to a desired value on a given adjustment of the contact 6, and accordingly, the resistance 115a and contact 115b may be dispensed with and the control electrode of valve 100 connected to the right end terminal of the resistance 115 as shown in Fig. 4. When the resistance 115a and contact 115b are thus dispensed with, it is noted the initial tendency upon sudden changes in position of the contact 6 is to produce an adjustment of the contact 10 and the valve 2 to their extreme position, but when the maximum rate of adjustment of the contact 10 is suitably limited, as noted above, the maximum magnification may be kept within desirable limits without requiring the use of resistance 115a and contact 115b.

The resistances 115 and 115a and condenser 116 are desirably so proportioned that the initial magnified adjustment of the fuel valve 2 is removed at a point near the ending of the time of increasing departure of the furnace temperature from the desired normal value and consequently the magnified adjustment may be made appreciable in magnitude to thereby effect an extremely fast return of the furnace temperature to the desired value. Furthermore, as explained hereinbefore, as the furnace temperature begins to return to the desired value, the contact 10 will be given a magnified adjustment towards its initial position and therefore the removal of the corrective control effect will be effected at a magnified rate.

The effect of such operation is to permit the initial corrective control effect in the supply of heat to the furnace to be much larger than would be possible otherwise without resulting in overshooting and consequent hunting. This end is obtained because the greater part of the corrective effect is applied during the time of increasing departure of the furnace temperature from the desired value and is removed at a suitable time before the furnace temperature has returned to the desired value to avoid overshooting and consequent hunting.

The duration and effective value of the magnification in the control effect produced by the condenser 116 and its associated elements, as described above, may be varied by adjustment of the knob 117. The effect of adjustment of the knob 117 is to vary the time required to charge the condenser 116 to the potential between the contact 6 and the bridge junction 102.

In Fig. 4 I have further illustrated, more or less diagrammatically, a modification of the arrangement of Fig. 3 in which the rectifier 108 of Fig. 3 has been dispensed with so that alternating current is supplied the bridge network 82, and a plural stage condenser unit is employed for effecting the desired resetting operations. In Fig. 4 I have also illustrated in detail an amplifier 33a which may desirably be employed. It will be apparent the amplifier 33a of Fig. 4 may be employed in the arrangement of Figs. 2 and 3, if desired.

The plural stage condenser arrangement referred to above for effecting the desired resetting adjustments includes a condenser 118 and a resistance 119 connected in series across the terminals of the condenser 95. As shown, the conductor 96, in which the resistance 97 is inserted, is connected to the junction of condenser 118 and resistance 119. One effect of such a plural stage arrangement over the single stage form of Figs. 2 and 3 is to increase the time required to charge the condenser unit and hence to decrease the rate of adjustment of the resetting adjustments of the contact 10 and the fuel valve 2. It will be apparent more stages may be added, if desired.

The electronic amplifier 33a shown in detail in Fig. 4 includes a pair of electronic valves 120 and 121, which valves are heater type tetrodes including anode, cathode, filament, screen and control electrode elements, and the output circuits of which are coupled by means of a transformer 122 to the winding 36 of motor 9. As shown, the valves 120 and 121 may desirably be included in the same envelope. Anode voltage is supplied the valves 120 and 121 from the alternating current supply conductors $L^1$ and $L^2$, and as illustrated, the supply conductor $L^1$ is connected through a biasing resistance 123 shunted by a condenser 124 to the cathodes of the valves, which are connected together; and the supply conductor L² is connected to a center tap on the secondary winding 125 of the transformer 122. One terminal of the transformer winding 125 is connected to the anode of valve 120 and the other terminal of the winding is connected to the anode of the valve 121.

The conductivities of the valves 120 and 121 are adapted to be controlled in accordance with the conductivities of the valves 99 and 100. To this end the output circuits of the valves 99 and 100 are directly coupled to the input circuits of the valves 120 and 121. As shown, the control electrode of the valve 120 is connected by a conductor 126 to the negative end of a resistance 129 in the anode circuit of the valve 99, and the control electrode of the valve 121 is connected by a conductor 127 to the negative end of a resistance 130 in the anode circuit of the valve 100. The positive ends of the resistances 129 and 130 are connected to the negative end of the biasing resistance 123 so that variations in the potentials across the resistances 129 and 130 will produce corresponding variations of the potentials on the control electrodes of the valves 120 and 121.

Anode voltage is also supplied the valves 99 and 100 from the supply conductors L¹ and L², but it will be noted the valves 99 and 100 are connected thereacross in an inverse manner with respect to the connection of valves 120 and 121. Thus, valves 99 and 100 and valves 120 and 121 will be conductive only during alternate half cycles of the supply line voltage and thereby the conductivities of the valves 120 and 121 will be controlled in accordance with the difference in the magnitudes of the currents conducted by the valves 99 and 100 during the preceding half cycle of the supply line voltage. As illustrated, a condenser 131 is connected between the anodes of the valves 99 and 100 for effecting such control of a successive pair of valves during the next later half cycle.

With the arrangements of Figs. 2-4, it is noted that since the high resistance 97 is the only direct connection between the bridge networks 82 and 83, the said bridge networks must be well insulated from each other in order to guard against the establishment of a low resistance shunt about the resistance 97. The effect of such a low resistance in shunt to the high resistance 97 is to render the network 83 ineffective to rebalance the control network 81 on the occurrence of an adjustment of the contact 6 whereby the fuel valve 2 will be adjusted to its fully opened or closed position whenever the network 82 is unbalanced. It will be apparent, however, that by insulating the networks 82 and 83 from each other in any convenient manner, the occurrence of a low resistance in shunt to the resistance 97 can readily be avoided.

In Fig. 5, I have illustrated, more or less diagrammatically, a further modification of the arrangement of Fig. 2 in which it is not necessary to insulate the networks 82 and 83 from each other in guarding against the establishment of a leakage path about the resistance 97. In this form of my invention the junctions 102 and 103 of the networks 82 and 83 are directly connected by the conductor 94, and the condenser means for producing the desired resetting operations of the apparatus have been connected between the contact 10 and the high resistance 97. With this arrangement it will be apparent that it is not necessary to insulate the networks 82 and 83 from each other since they are directly connected by the conductor 94. Thus, the prevention of the occurrence of a low resistance shunt about the resistance 97 is greatly simplified.

The condenser means employed in Fig. 5 for effecting the desired resetting adjustments of the apparatus have been illustrated as a plural stage condenser unit and may be identical with the plural stage condenser unit described in connection with Fig. 4.

In this embodiment of my invention the amplifier 33a has been dispensed with and a simplified relay arrangement employed instead for controlling the selective energization of a reversible motor to effect the desired circuit rebalancing and fuel valve adjustments. As illustrated, the valves 99 and 100 are adapted to control the selective energization of a pair of relay coils 132 and 133 and thereby the adjustment of a movable contact 134 into engagement with one or the other of a pair of contacts 135 and 136. The contact 134 is carried by a lever 137 which is pivoted at a point 138 and also carries a pair of armatures 139 and 140 which extend part way into the relay coils 132 and 133, respectively. The armatures 139 and 140 are connected to the lever 137 at points on opposite sides of the pivot point 138 so that when one or the other of the relay coils 132 and 133 is energized to a greater extent than the other, the associated armature will be pulled farther into the coil and rotate the lever 137 about its pivot point to thereby effect movement of the contact 134 into engagement with one or the other of the contacts 135 and 136. When both of the relay coils are deenergized, the lever 137 is biased by gravity into a position wherein the contact 134 is intermediate the contacts 135 and 136. In this embodiment, anode voltage is supplied the valves 99 and 100 and thereby the coils 132 and 133 from the secondary winding 141 of the transformer 107.

The contacts 135 and 136 are each connected to a terminal of a pair of windings 142 and 143, respectively, of a reversible electrical motor 144. The other terminals of the motor windings 142 and 143 are connected together and to the alternating current supply conductor L² and the contact 134 is connected to the supply conductor L¹ so that on engagement of the contact 134 with one or the other of the contacts 135 and 136, an energizing circuit will be closed to a corresponding winding 142 or 143 of the motor. The closure of that circuit will produce rotation of the motor in one direction or the other and thereby adjustment of the contact 10 and the fuel valve 2.

Figure 6:
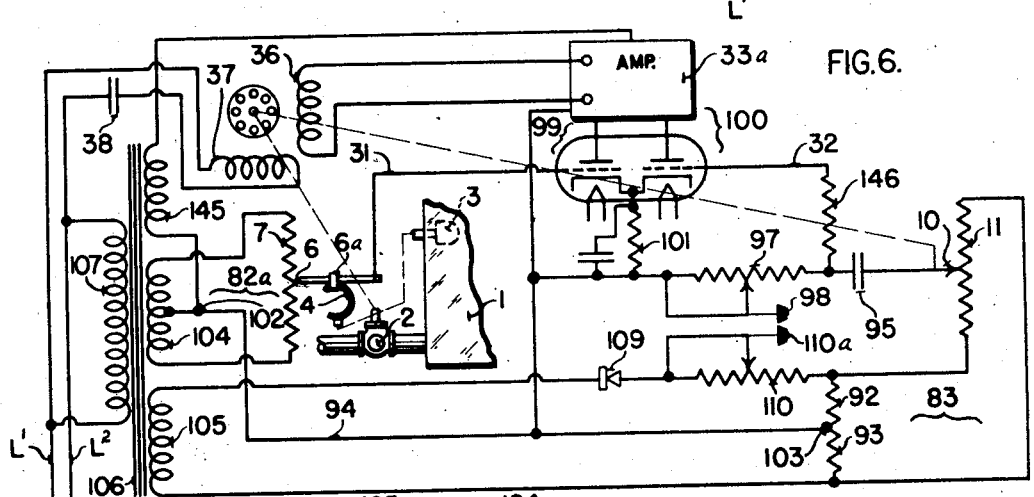

In Fig. 6 I have illustrated more or less diagrammatically another modification of the arrangement of Fig. 2 in which the energizing voltage for the amplifier 33a is supplied from the secondary winding 145 of the transformer 106 and in which a bridge network 82a is employed in lieu of the bridge network 82. In the modification of Fig. 6, as well as in the modification of Fig. 5, it is not necessary to insulate the networks 82a and 83 in guarding against the establishment of a leakage path about the high resistance 97. As illustrated, the bridge network 82a is simpler in form than the corresponding network 82 of Fig. 2 in that the resistances 90 and 91 of the latter have been dispensed with. The network 82a is comprised of only the transformer secondary winding 104 and the slidewire resistance 7 which is connected across the terminals of the winding 104. A center tap 102 on the transformer winding 104 is connected by the conductor 94 to the junction 103 of the bridge network 83.

In this arrangement, as in the apparatus of

Fig. 5, the condenser 95 for controlling the resetting operation of the system is connected between the contact 10 and the high resistance 97. The junction of the condenser 95 and the high resistance 97 is connected by a conductor 32 to the control electrode of the valve 100. As illustrated a resistance 146 may desirably be inserted in the conductor 32 to prevent the discharge of the condenser 95 by the flow of grid currents in the valve 100.

While only a single condenser 95 has been employed for effecting the resetting operation of the apparatus, it will be apparent a plural stage condenser unit as shown in Fig. 5 may be employed instead. Furthermore, while no provisions have been made in the arrangement of Fig. 6 for effecting an initial magnified correction of the fuel valve 2, it will be plain that such provisions may be added in the manner described in connection with one or the other of Figs. 1-5, if desired.

Figure 7:
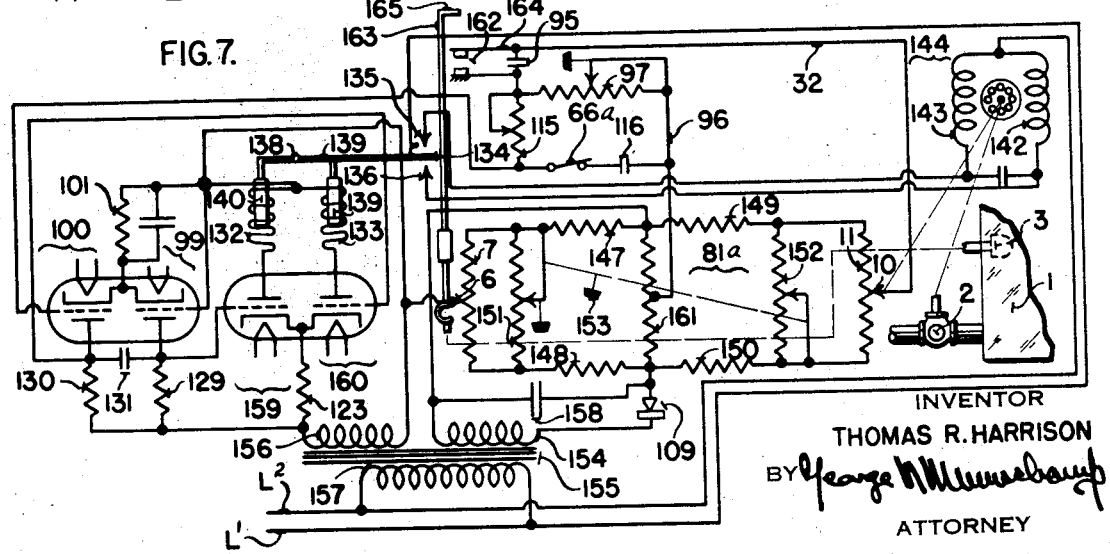

In Fig. 7 I have illustrated, more or less diagrammatically, a modification of the control apparatus of Fig. 5 in which the bridge networks 82 and 83 of the latter arrangement have been replaced by a single bridge network 81a. The bridge network 81a includes the slidewire resistance 7 and a pair of resistances 147 and 148 in two of its opposed arms, and the slidewire resistance 11 and a pair of resistances 149 and 150 in its remaining arms. A resistance 151 is connected in parallel to the resistance 7, and a resistance 152 is connected in parallel to the slidewire resistance 11. The resistances 151 and 152 are simultaneously adjustable in opposite directions by a knob 153 and are provided for effecting Energizing voltage is supplied the bridge network 81a from the secondary winding 154 of a transformer 155 having another secondary winding 156 and a line voltage primary winding 157 connected to the alternating current supply conductors L¹ and L². A rectifier 109 is connected in one energizing connection to the bridge network and a condenser 158 is connected across the energizing terminals of the network so that substantially steady direct current is supplied the latter.

Unbalance of the network 81a may be detected by a single stage amplifier arrangement as shown in Fig. 5 to control the selective energization of a pair of relays 132 and 133, if desired, but in this form of my invention I have illustrated a two stage amplifier for that purpose. As illustrated, the relays 132 and 133 are connected in the output circuits of electronic valves 159 and 160, respectively, and the input circuits of the latter are adapted to be controlled by the output circuits of the valves 99 and 100. To this end, the output circuits of the valves 99 and 100 are coupled to the input circuits of the valves 159 and 160 in a manner identical to the coupling between the valves 99 and 100 and the valves 120 and 121 of Fig. 4.

Anode voltage is supplied the valves 99, 100, 159 and 160 from the transformer secondary winding 156 and, as shown, the pairs of valves 99, 100 and 159, 160 are connected in inverse relationship to each other whereby the said pairs of valves will be conductive during alternate half cycles of the supply voltage.

Since an additional stage of amplification is employed in this form of my invention, it will be apparent that the relays 132 and 133 may be larger and more rugged in construction than the correspondingly identified parts of Fig. 5 although the operation of the relays is the same and selectively controls the motor 144 for rotation in one direction or the other in accordance with the direction of unbalance of the network 81a.

The provisions for effecting the desired resetting and initial magnified correction adjustments of the fuel valve 2 in this embodiment include a resistance 161, connected between the energizing terminals of the network 81a, and the elements 95, 97, 115 and 116 which are connected between the contact 10 and a center tap on the resistance 161. The connection and operation of the elements 95, 97, 115 and 116 is identical to that of the correspondingly identified parts of Fig. 5 and hence further description is not believed necessary.

In this embodiment of my invention I have illustrated an alternative arrangement to that shown in Fig. 3 for arresting the resetting operation of the condenser 95 when the contact 6 assumes a predetermined low temperature position which it does not reach during the ordinary operation of the system and normally assumes only when the furnace is being started or shut down. This alternative arrangement referred to includes a normally open switch 162 connected to the terminals of the condenser 95 and which is adapted to be actuated into a closed position by an arm 163 carried by the Bourdon tube 4, as shown, when the contact 6 reaches a predetermined low position. The switch 162 comprises a stationary contact connected to the lower terminal of the condenser 95 as seen in Fig. 7 and a movable contact connected to the other condenser terminal and carried by a flexible arm 164. A hook 165 at the upper end of the arm 163 is adapted to engage the flexible arm 164 when the arm 163 reaches a predetermined position in its downward movement and moves the movable contact of the switch 162 into engagement with the stationary contact to thereby close a low resistance shunt about the condenser 95. The arm 163 is desirably made in two sections held together by an expansion joint, which may be of any well known form, so as to permit further downward movement of the contact 6 when the switch 162 is in its closed position.

In Fig. 8 I have illustrated, more or less diagrammatically, a modification of the arrangement of Fig. 7 in which a simplified bridge network 81b energized from direct current supply conductors L³ and L⁴ is employed. As shown, the bridge network 81b includes a slide wire resistance 7 in two of its opposed arms and a slide wire resistance 11 in the remaining arms. A resistance 161 having a center tap is connected to the energizing terminals of the bridge network 81b and has its center tap connected through the resistance 97 and condenser 95 to the contact 10 as in the arrangement of Fig. 7.

A voltage divider 166, of which the slide wire resistance 7 comprises an extension, is connected between the direct current supply conductors L³ and L⁴ and supplies energizing current to the electronic valves 99 and 100 in addition to the bridge network 81b. The contact 6 is connected to the negative terminal of the biasing resistance 101 in the cathode circuits of the valves 99 and 100, to which terminal the control electrode of the valve 99 is also connected. The control electrode of the valve 100 is connected to the junction of the condenser 95 and the resistance 97.

The output circuits of the valves 99 and 100 are connected to the input circuit of an electronic amplifier 33a which may be identical to the amplifier 33a shown in Fig. 4. The only difference in this arrangement over that disclosed in Fig. 4 is that direct current is supplied the anode circuits of the valves 99 and 100 in Fig. 8 whereas alternating current is supplied those valves in Fig. 4. The operation of the amplifiers are the same, however, so that when the conductivity of the valve 100 of Fig. 8 rises above or falls below that of the valve 99, an alternating current in phase with or 180° out of phase with the voltage of the supply conductors L¹ and L² will be supplied the winding 36 of motor 9 to thereby produce rotation of the motor in a corresponding direction.

It will be apparent that with the arrangement of Fig. 8, the current in the cathode circuits of the valves 99 and 100 will flow through the lower portion of the slide wire resistance 7. In some cases this may be objectionable in that such cathode current flows may disturb the balance of the bridge network 81b and will result in inaccuracies in the control operation of the apparatus.

In Fig. 9 I have illustrated more or less diagrammatically a further modification of the arrangement of Fig. 7 in which the cathode current flows through the valves 99 and 100 are shunted about the bridge network 81a so that the objectionable feature referred to above in connection with Fig. 8 is avoided. As illustrated the bridge network 81a may be identical to the corresponding part of Fig. 7 but is supplied with energizing current from the direct current supply conductors L³ and L⁴. As shown current limiting resistances 167 and 168 may be connected in the energizing connections to the bridge network 81a. The electronic valves 99 and 100 are connected to the input circuit of the amplifier 32a in a manner identical to that described in connection with Fig. 8.

In Fig. 9 I have illustrated an arrangement alternative to the arrangements shown in Figs. 3 and 7 for arresting the resetting operations of the condenser 95 when the contact 6 assumes a predetermined low temperature position which it does not reach during the ordinary operation of the system and normally assumes only when the furnace is being started or shut down. This alternative arrangement includes a switch 162 which may be identical to and actuated in the same manner as the corresponding switch 162 of Fig. 7. The contact of switch 162 carried by the flexible member 164 is connected in Fig. 9 to the terminal of the condenser 95 remote from the resistance 97 and is also connected by the conductor 32, in which a resistance 10a is inserted, to the contact 10. The resistance 10a may be suitably high in value, but is appreciably smaller in value than the resistance 97. The stationary contact of the switch 162 is connected by a low resistance conductor to a contact 7a which is adjustable along the slidewire resistance 7, as, for example, by a knob 7b.

As will become apparent, when the switch 162 is actuated into its closed position, the potential on the condenser 95 will build up to or fall off to the potential difference existing between the contact 7a and the network junction 161a and will be maintained at that potential irrespective of the position of the contact 10. This effect is obtained because of the presence of the resistance 10a in the connection of the contact 10 to the condenser 95. The potential so maintained on the condenser 95 may be adjusted as desired, simply by adjustment of the knob 7b.

An important advantage of this arrangement is that the potential on the condenser 95 may be adjusted to a value corresponding to the load on the furnace when the latter is being started up so that when the furnace temperature has reached the desired value the contact 10 and the fuel valve 2 will have been adjusted to their correct positions to maintain the furnace temperature at that value.

In Fig. 10 I have illustrated one form of control apparatus for use in conjunction with and to provide parts of the control circuit arrangement of Fig. 9. It is to be understood, however, that most of the apparatus parts shown in Fig. 10 may be used with the other control circuit forms of the invention. The apparatus shown in Fig. 10 comprises a control panel 169 in which is mounted a control instrument 170 for measuring the furnace temperature control quantity and for adjusting the contact 6 and the switch 162 of Fig. 9. In addition panel 169 provides a support for all of the control apparatus shown in Fig. 9 except the motor 9 and the associated balancing resistance 11 of the bridge network 81a, both of which ordinarily must be located adjacent to the fuel valve 2 or other device controlled and at a distance from the control apparatus shown in Fig. 10. As shown the control instrument 170 is of the commercial Brown potentiometer type including a movable carriage 171 which is deflected in accordance with variations in the quantity measured by means of a screw shaft 172. The latter is rotated in one direction or the other by the rebalancing mechanism of the instrument in response to deflections of the pointer 173 of a galvanometer which responds to unbalance in the potentiometer measuring system. When such a potentiometric instrument is used in lieu of the simple Bourdon tube type of thermometer of Fig. 9, the furnace temperature responsive bulb 3 is ordinarily replaced by a thermocouple and the galvanometer responds to unbalance between the thermocouple voltage and the voltage drop in the variable portion of the potentiometer slidewire resistance portion connected in series with the thermocouple and galvanometer. Further description or illustration of the measuring and rebalancing features of the instrument 170 is unnecessary, as they form no part of the present invention and in respect to those features the instrument 170 is of well known commercial type and generally alike or equivalent in principle to the control potentiometer instrument shown in Patent 1,946,280, granted to me February 6, 1934.

The Brown potentiometer control instrument movable carriage 171 gives movements to a pen 174, tracing a record of the value of the quantity measured on a chart 175 and cooperates for control purposes with a control table 176. The latter is located at a point along the path of travel of the pen carriage 171 which may be adjusted and fixes the normal or desired value of the controlled quantity measured by the instrument. A part 177 carried by the control table 176 and a cooperating part 178 of the pen carriage 171 cooperate to adjust a pivoted part 179 angularly about its pivotal axis 180 into different positions corresponding to different distances of departure of the controlled quantity from the desired or normal value thereof.

As shown in Figs. 11 and 12 member 179 is connected by a link 181 to the arm 182 of a rock shaft 183 which is thereby given angular adjustments corresponding to those given the part 179. The rock shaft 183 supports and moves arms which support or carry the contact 6 and the arm 163 of Fig. 9 which engage the slide wire resistance 7 and the flexible arm 164 of switch 162, respectively.

The panel 169 may desirably support at its rear side and below the instrument 170 the supporting chassis of the amplifier 33a. Mounted on the panel 169 at the front side of the panel 169 are the previously mentioned switch 66a and the knobs or dials 7b, 98, 117, 117a and 153 for effecting the various apparatus adjustments.

As will be apparent to those skilled in the art, the instrument 169 of Figs. 10–12 may be replaced by an instrument of another known or suitable form adapted to measure a control quantity and directly or through suitable relay mechanism to give corresponding adjustments to the contacts 6 and 162. The control quantity is not necessarily temperature but may be a pressure, velocity or other force susceptible of measurement by the instrument and a measure of which may be advantageously utilized in effecting a control operation.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a control system, a normally balanced electrical network, means to unbalance said network in response to a condition change, control means responsive to unbalance of said network to control said condition in the direction to counteract said change and including follow-up means to rebalance said network on unbalance thereof, and reset means included in said network and operative only while said condition is departing from a predetermined value to further unbalance said network in the same direction.

2. In a control system, an electrical network, means to adjust said network in response to a condition change, control means responsive to said network adjustment to control said condition in the direction to counteract said change and thereby stabilize said condition, and reset means included in said network and operative only while said condition is departing from a predetermined value to further adjust said control means in the same direction and thereby restore said condition to a predetermined value.

3. In a control system, the combination of a device to be positioned to a plurality of positions for controlling the value of a condition, electrical control means the state of which is varied in accordance with changes in the value of the condition to be controlled and having a desired state corresponding to a desired normal value of the condition, means for positioning said device in accordance with the state of said electrical control means to maintain said condition at said desired normal value, reset means including an electrical reactance means to further vary the state of said electrical control means on departure of said condition from said normal value, and means to short circuit said electrical reactance means to render said reset means inoperative when the extent of departure of said condition from said desired normal value exceeds a predetermined amount.

4. In a control system, two separate electrical bridges, an impedance and an associated element included in each of said bridges, said impedance and associated element being adapted for relative movement to form a control couple, an electrical connection between said bridges, means responsive to a control condition for relatively adjusting one of said control couples on a change in said condition, means connected to each of said bridges and responsive to a change in an electrical condition of said bridges produced by said adjustment for effecting a corrective action on said control condition in the direction to counteract said change and for effecting a corresponding relative adjustment of the second said control couple to neutralize the change in the electrical condition of said bridges produced by the adjustment of said one couple, and means responsive to changes in the value of said control condition irrespective of the actual value thereof to effect a further corrective action of a variable amount depending upon the rate of adjustment of said one control couple by said first mentioned means on said control condition in the same direction immediately upon change in trend of the value of said condition.

5. The combination of claim 4 wherein said last mentioned means include means to reduce the neutralizing effect of an adjustment of said second control couple.

6. The combination of claim 4 wherein said last mentioned means are electrical means and include electrical reactance means to reduce the neutralizing effect of an adjustment or said second control couple.

7. The combination of claim 4 wherein said last mentioned means are electrical means and include electrical capacitance means to reduce the neutralizing effect of an adjustment or said second control couple.

8. In a control system, a normally balanced electrical network, electrical current energizing means for said network, means to unbalance said network in response to a condition change, control means responsive to unbalance of said network to control said condition in the direction to counteract said change and including follow-up means to rebalance said network on unbalance thereof, and means controlled by said condition responsive means to vary said electrical current energizing means and thereby the energization of said network to effect a further corrective action on said condition in the same direction.

9. In a control system, a normally balanced electrical network, means to unbalance said network in one direction or the other in response to a condition change, control means responsive to unbalance of said network to control said condition in the direction to counteract said condition change and including follow-up means to rebalance said network on unbalance thereof, and means operative as an incident to actuation of said first mentioned means by a condition change to unbalance said network an additional amount in the same direction to thereby effect an initial magnified corrective action of said control means to counteract said condition change and to later unbalance said network in a sense such as to reduce the corrective action of said control means when the rate of change of said condition as measured by said first mentioned means is lower than a predetermined finite value.

10. In a control system, a normally balanced electrical network, means to unbalance said network in response to a condition change, control means responsive to unbalance of said network to control said condition in the direction to counteract such change and including adjustable follow-up means to rebalance said network on unbalance thereof, and means responsive to changes in the value of said condition to temporarily reduce the rebalancing effect of adjustment of said follow-up means to effect a further corrective action on said condition in the same direction immediately upon change in the trend of the value of said condition.

11. The combination of claim 10 wherein said last mentioned means are physically stationary.

12. In a control system, means for producing an electromotive force representative of the magnitude of a variable condition to be controlled, an adjustable source of electromotive force, means to oppose said electromotive forces to derive an electrical potential varying in accordance with the difference between said electromotive forces, means for controlling a corrective agent for said condition, a device under control of said potential to control said last mentioned means and to adjust said second mentioned electromotive force to balance said first mentioned electromotive force and physically stationary means to temporarily reduce the balancing effect of adjustment of said second mentioned electromotive force.

13. In a control system, the combination of a device adapted to be adjusted to different positions in accordance with the changes in a variable condition to be controlled, electrically controlled means adapted to be controlled in one sense or in an opposite sense, adjustable means to control said electrically controlled means, means through which a movement of said device from one position to another adjusts said adjustable means to control said electrically controlled means in a sense and to an extent depending upon the direction and magnitude of the movement, adjustable means adjusted by said electrically controlled means tending to neutralize the adjustment of said adjustable means, and means reducing the neutralizing effect of adjustment of said last mentioned adjustable means a variable amount depending upon the rate of adjustment of said device.

14. In a control system, two separate electrical bridges, an impedance and an associated element included in each of said bridges, said impedance and associated element being adapted for relative movement to form a control couple, an electrical connection between said bridges, means responsive to a control condition for relatively adjusting one of said control couples on a change in said condition, means connected to each of said bridges and responsive to a change in an electrical condition of said bridges produced by said adjustment for effecting a corrective action on said control condition in the direction to counteract said change and for effecting a corresponding relative adjustment of the second said control couple to neutralize the change in the electrical condition of said bridges produced by the adjustment of said one couple, means responsive to changes in the value of said control condition irrespective of the actual value thereof to effect a further corrective action on said control condition in the same direction immediately upon change in trend of the value of said condition, and reset means to slowly effect a further corrective action on said control condition in the same direction.

15. The combination of claim 14 wherein said reset means are physically stationary.

16. The combination of claim 14 wherein said means responsive to changes in the value of the condition irrespective of the actual value thereof are physically stationary.

17. The combination of claim 14 wherein said reset means and said means responsive to changes in the value of the condition irrespective of the actual value thereof are physically stationary.

18. In a control system, a normally balanced electrical network, means to unbalance said network in response to a condition change, control means responsive to unbalance of said network to control said condition in the direction to counteract said change and including follow-up means to rebalance said network on unbalance thereof, means responsive to changes in the value of said condition to effect a further corrective action on said condition in the same direction immediately upon change in the trend of the value of said condition, and reset means jointly controlled by said first mentioned means and by said control means to slowly effect a further corrective action on said condition in the same direction.

19. The combination of claim 18 wherein said reset means is adapted to effect such further corrective action on said condition only when said condition is departing from a predetermined value.

20. In a control system, a normally balanced electrical network, means to unbalance said network in response to a condition change, control means responsive to unbalance of said network to control said condition in the direction to counteract said change and including follow-up means to rebalance said network on unbalance thereof, means responsive to changes in the value of said condition to effect a further corrective action on said condition in the same direction immediately upon change in the trend of the value of said condition, and physically stationary reset means to slowly effect a further corrective action on said condition in the same direction.

21. In a control system, a normally balanced electrical network, means to unbalance said network in response to a condition change, control means responsive to unbalance of said network to control said condition in the direction to counteract said change and including adjustable follow-up means to rebalance said network on unbalance thereof, means responsive to changes in the value of said condition to reduce the rebalancing effect of adjustment of said follow-up means to effect a further corrective action on said condition in the same direction immediately upon change in the trend of the value of said condition, and reset means to slowly effect a further corrective action on said condition in the same direction.

22. The combination of claim 21 wherein said reducing means are physically stationary.

23. The combination of claim 21 wherein said reset means are physically stationary.

24. The combination of claim 21 wherein said reducing means and said reset means are physically stationary.

25. In a control system the combination of a device to be positioned to a plurality of positions for controlling the value of a condition, an electrical network, means to adjust said network in response to changes in said condition, control means responsive to said network adjustment to position said device in the direction to counteract said change, means responsive to changes in the value of said condition irrespective of the actual value thereof to further position said device in the same direction immediately upon change in the trend of the value of said condition, and reset means jointly controlled by said first mentioned means and by said control means to slowly effect a further corrective action on said condition in the same direction.

26. The combination of claim 25 wherein said reset means is adapted to effect such further corrective action on said condition only when said condition is departing from a predetermined value.

27. In a control system, two separate electrical bridges, an impedance and an associated element included in each of said bridges, said impedance and associated element being adapted for relative movement to form a control couple, an electrical connection between said bridges, means responsive to a control condition for relatively adjusting one of said control couples on a change in said condition, means connected to each of said bridges and responsive to a change in an electrical condition of said bridges produced by said adjustment for effecting a corrective action on said control condition in the direction to counteract said change and for effecting a corresponding relative adjustment of the second said control couple to neutralize the change in the electrical condition of said bridges produced by the adjustment of said one couple, means operative as an incident to actuation of said first mentioned means by a condition change to effect an additional change in the electrical condition of said bridges in the same direction to thereby effect an initial magnified corrective action of said second mentioned means on said control condition and to later effect a change in the electrical condition of said bridges in a sense such as to reduce the corrective action of said second mentioned means on said control condition when the rate of change of said control condition as measured by said first mentioned means is lower than a predetermined finite value, and reset means to slowly effect a further corrective action on said control condition in the same direction.

28. In a control system, two separate electrical bridges, an impedance and an associated element included in each of said bridges, said impedance and associated element being adapted for relative movement to form a control couple, an electrical connection between said bridges, means responsive to a control condition for relatively adjusting one of said control couples on a change in said condition, means connected to each of said bridges and responsive to a change in an electrical condition of said bridges produced by said adjustment for effecting a corrective action on said control condition in the direction to counteract said change and for effecting a corresponding relative adjustment of the second said control couple to neutralize the change in the electrical condition of said bridges produced by the adjustment of said one couple, means responsive to changes in the value of said control condition irrespective of the actual value thereof to effect a further corrective action on said control condition in the same direction immediately upon change in trend of the value of said condition, and reset means included in at least one of said bridges and operative only while said condition is departing from a predetermined value to further unbalance said network in the same direction.

29. In a control system, two separate electrical bridges, an impedance and an associated element included in each of said bridges, said impedance and associated element being adapted for relative movement to form a control couple, an electrical connection between said bridges, means responsive to a control condition for relatively adjusting one of said control couples on a change in said condition, means connected to each of said bridges and responsive to a change in an electrical condition of said bridges produced by said adjustment for effecting a corrective action on said control condition in the direction to counteract said change and for effecting a corresponding relative adjustment of the second control couple to neutralize the change in the electrical condition of said bridges produced by the adjustment of said one couple, a second impedance and associated element included in at least one of said bridges, said last mentioned impedance and associated element being adapted for relative movement to form a third control couple, and means operative only while the control condition is departing from a predetermined value to adjust said third control couple to effect a further corrective action on said control condition in the same direction.

30. In a control system, two separate electrical bridges, an impedance and an associated element included in each of said bridges, said impedance and associated element being adapted for relative movement to form a control couple, an electrical connection between said bridges, means responsive to a control condition for relatively adjusting one of said control couples on a change in said condition, means connected to each of said bridges and responsive to a change in an electrical condition of said bridges produced by said adjustment for effecting a corrective action on said control condition in the direction to counteract said change and for effecting a corresponding relative adjustment of the second control couple to neutralize the change in the electrical condition of said bridges produced by the adjustment of said one couple, a second impedance and associated element included in at least one of said bridges, said last mentioned impedance and associated element being adapted for relative movement to form a third control couple, and means operative only while the control condition is stabilized at a value displaced from a predetermined value or is departing from said predetermined value to adjust said third control couple to effect a further corrective action on said control condition in the same direction.

31. In a control system, two separate electrical bridges, an impedance and an associated element included in each of said bridges, said impedance and associated element being adapted for relative movement to form a control couple, an electrical connection between said bridges, means responsive to a control condition for relatively adjusting one of said control couples on a change in said condition, means connected to each of said bridges and responsive to a change in an electrical condition of said bridges produced by said adjustment for effecting a corrective action on said control condition in the direction to counteract said change and for effecting a corresponding relative adjustment of the second control couple to neutralize the change in the electrical condition of said bridges produced by the adjustment of said one couple, a second impedance and associated element included in at least one of said bridges, said last mentioned impedance and associated element being adapted for relative movement to form a third control couple, and means operative as an incident to adjustment of said one control couple to adjust said third control couple to effect a further corrective action on said control condition in the same direction.

32. In a control system, a normally balanced electrical network, means to unbalance said network in response to a condition change, control means responsive to unbalance of said network to control said condition in the direction counteract said change and including follow-up means to rebalance said network on unbalance thereof, and reset means jointly controlled by said first mentioned means and by said control means and operative only while said condition is departing from a predetermined value to further unbalance said network in the same direction.

33. In a control system, a normally balanced electrical network, means to unbalance said network in response to a condition change, control means responsive to unbalance of said network to control said condition in the direction to counteract said change and including follow-up means to rebalance said network on unbalance thereof, and reset means connected to said network and including a reversible rotatable motor jointly controlled by said first mentioned means and by said control means to further unbalance said network in the same direction.

34. In a control system, the combination of a device to be positioned to a plurality of positions for controlling the value of a condition, a normally balanced electrical network, means to unbalance said network in response to changes in said condition, control means responsive to said network adjustment to position said device in the direction to counteract said change and including adjustable follow-up means to rebalance said network on unbalance thereof, means responsive to changes in the value of said condition to reduce the rebalancing effect of adjustment of said follow-up means to effect a further adjustment of said device in the same direction immediately upon change in the trend in the value of said condition, and reset means to slowly effect a further adjustment of said device in the same direction.

35. In a control system, the combination of a device to be positioned to a plurality of positions for controlling the value of a condition, a normally balanced electrical network, means to unbalance said network in response to changes in said condition, control means responsive to said network adjustment to position said device in the direction to counteract said change and including adjustable follow-up means to rebalance said network on unbalance thereof, means responsive to changes in the value of said condition to reduce the rebalancing effect of adjustment of said follow-up means to effect a further adjustment of said device in the same direction upon change in the trend in the value of said condition, reset means to slowly effect a further adjustment of said device in the same direction, and means to render said reset means inoperative when the extent of departure of said condition from said desired normal value exceeds a predetermined amount.

36. In a control system, the combination of a device to be positioned to a plurality of positions for controlling the value of a condition, control means the state of which is varied in accordance with changes in the value of the condition to be controlled and having a desired state corresponding to a desired normal value of the condition, means for positioning said device in accordance with the state of said control means to maintain said condition at said desired normal value, physically stationary reset means to further vary the state of said control means on departure of said condition from said normal value, and means to render said physically stationary reset means inoperative when the extent of departure of said condition from said desired normal value exceeds a predetermined amount.

37. In a control system, two separate electrical bridges, an impedance and an associated element included in each of said bridges, said impedance and associated element being adapted for relative movement to form a control couple, an electrical connection between said bridges, means responsive to a control condition for relatively adjusting one of said control couples on a change in said condition, means connected to each of said bridges and responsive to a change in an electrical condition of said bridges produced by said adjustment for effecting a corrective action on said control condition in the direction to counteract said change and for effecting a corresponding relative adjustment of the second said control couple to neutralize the change in the electrical condition of said bridges produced by the adjustment of said one couple, and means responsive to changes in the value of said control condition irrespective of the actual value thereof to effect a further corrective action on said control condition in the same direction immediately upon change in trend of the value of said condition, said last mentioned means including means to vary an electrical condition of at least one of said bridges.

38. In a control system, two separate electrical bridges, an impedance and an associated element included in each of said bridges, said impedance and associated element being adapted for relative movement to form a control couple, an electrical connection between said bridges, means responsive to a control condition for relatively adjusting one of said control couples on a change in said condition, means connected to each of said bridges and responsive to a change in an electrical condition of said bridges produced by said adjustment for effecting a corrective action on said control condition in the direction to counteract said change and for effecting a corresponding relative adjustment of the second said control couple to neutralize the change in the electrical condition of said bridges produced by the adjustment of said one couple, and physically stationary means responsive to changes in the value of said control condition irrespective of the actual value thereof to effect a further corrective action on said control condition in the same direction immediately upon change in trend of the value of said condition.

39. In a control system, the combination of a device adapted to be adjusted to different positions in accordance with the changes in a variable condition to be controlled, electrically controlled means adapted to be controlled in one sense or in an opposite sense, adjustable means to control said electrically controlled means, means through which a movement of said device from one position to another adjusts said adjustable means to control said electrically controlled means in a sense and to an extent depending upon the direction and magnitude of the movement, adjustable means adjusted by said electrically controlled means tending to neutralize the adjustment of said adjustable means, and physically stationary means reducing the neutralizing effect of adjustment of said last mentioned adjustable means.

40. In a control system, the combination of a device to be positioned to a plurality of positions for controlling the value of a condition, a normally balanced electrical network, means to unbalance said network in response to changes in said condition, control means responsive to said network adjustment to position said device in the direction to counteract said change and including adjustable follow-up means to rebalance said network on unbalance thereof, reset means to slowly effect a further adjustment of said device in the same direction, and means to modify the operation of said reset means when the extent of departure of said condition from said desired normal value exceeds a predetermined amount.

THOMAS R. HARRISON.